US012486585B2

(12) United States Patent
Pham et al.

(10) Patent No.: US 12,486,585 B2
(45) Date of Patent: Dec. 2, 2025

(54) CARBON CAPTURE USING ELECTROCHEMICALLY-PRODUCED ACID AND BASE

(71) Applicant: ELECTRASTEEL, INC., Boulder, CO (US)

(72) Inventors: Ai Quoc Pham, Boulder, CO (US); Sandeep Nijhawan, Boulder, CO (US); Kevin Galloway, Boulder, CO (US); Adolfredo Alvarez, Boulder, CO (US); Philip Wagner, Boulder, CO (US); Steven Fatur, Boulder, CO (US)

(73) Assignee: ELECTRASTEEL, INC., Boulder, CO (US)

( * ) Notice: Subject to any disclaimer, the term of this patent is extended or adjusted under 35 U.S.C. 154(b) by 0 days.

(21) Appl. No.: 18/825,688

(22) Filed: Sep. 5, 2024

(65) Prior Publication Data

US 2024/0425994 A1 Dec. 26, 2024

Related U.S. Application Data

(63) Continuation of application No. 18/548,303, filed as application No. PCT/US2022/020796 on Mar. 17, 2022.
(Continued)

(51) Int. Cl.
C25B 1/20 (2006.01)
C02F 1/461 (2023.01)
(Continued)

(52) U.S. Cl.
CPC ............ C25B 1/20 (2013.01); C02F 1/46104 (2013.01); C22B 3/10 (2013.01); C22B 3/12 (2013.01);
(Continued)

(58) Field of Classification Search
None
See application file for complete search history.

(56) References Cited

U.S. PATENT DOCUMENTS 1,412,174 A 4/1922 Eustis et al.
2,198,045 A 4/1940 Suchy et al.
(Continued)

FOREIGN PATENT DOCUMENTS

CN 110499400 11/2019
CN 112758973 5/2021
(Continued)

OTHER PUBLICATIONS

Aliprandini, Paula, et al. "Precipitation of metals from synthetic laterite nickel liquor by NaOH." 8th Int. Semin. Process Hydrometall 28 (2016): 1-8 (Year: 2018).*
(Continued)

Primary Examiner — Louis J Rufo
(74) Attorney, Agent, or Firm — Leydig Voit & Mayer, Ltd.

(57) ABSTRACT

A method of making a material for capturing carbon dioxide from the earth's atmosphere, comprises producing an acid and a base with an electrochemical acid-base generator; dissolving a mineral in the acid to produce a mineral rich solution, separating silica from the mineral rich solution to form a silica depleted solution; adding a first portion of the base to the silica depleted solution to remove impurities by precipitation, adding a second portion of the base until ferrous hydroxide $(Fe(OH)_2)$ precipitates, then pausing base addition and removing the ferrous hydroxide precipitate from the solution. Then adding a third portion of the base to the iron-depleted solution to precipitate magnesium hydroxide $(Mg(OH)_2)$ and/or calcium hydroxide $(Ca(OH)_2)$. Then recovering a salt solution and directing the recovered salt solution to the electrochemical acid-base generator to pro-
(Continued)

duce a new acid and a new base. The magnesium hydroxide and/or calcium hydroxide may be used to capture and sequester carbon dioxide from a $CO_2$-containing gas (e.g., air) by forming a carbonate or from the ocean by forming bicarbonate.

29 Claims, 10 Drawing Sheets

Related U.S. Application Data

(60) Provisional application No. 63/301,288, filed on Jan. 20, 2022, provisional application No. 63/173,000, filed on Apr. 9, 2021, provisional application No. 63/162,254, filed on Mar. 17, 2021.

(51) Int. Cl.
| | | |
|---|---|---|
| *C02F 101/10* | (2006.01) | |
| *C02F 103/08* | (2006.01) | |
| *C22B 3/10* | (2006.01) | |
| *C22B 3/12* | (2006.01) | |
| *C22B 21/00* | (2006.01) | |
| *C22B 26/10* | (2006.01) | |
| *C22B 26/22* | (2006.01) | |
| *C22B 61/00* | (2006.01) | |
| *C25B 1/22* | (2006.01) | |
| *C25B 9/19* | (2021.01) | |
| *C25B 9/70* | (2021.01) | |
| *C25B 15/08* | (2006.01) | |

(52) U.S. Cl.
CPC .......... *C22B 21/0023* (2013.01); *C22B 26/10* (2013.01); *C22B 26/22* (2013.01); *C22B 61/00* (2013.01); *C25B 1/22* (2013.01); *C25B 9/19* (2021.01); *C25B 9/70* (2021.01); *C25B 15/083* (2021.01); *C02F 2101/10* (2013.01); *C02F 2103/08* (2013.01)

(56) References Cited

U.S. PATENT DOCUMENTS

| | | | |
|---|---|---|---|
| 2,829,095 A | | 4/1958 | Oda et al. |
| 3,124,520 A | | 3/1964 | Juda |
| 3,135,673 A | | 6/1964 | Tirrell et al. |
| 3,222,267 A | | 12/1965 | Tirrell et al. |
| 3,344,050 A | | 9/1967 | Mayland et al. |
| 3,692,649 A | | 9/1972 | Prigent et al. |
| 4,124,683 A | | 11/1978 | Lalancette |
| 4,140,602 A | | 2/1979 | Lewis et al. |
| 4,219,396 A | | 8/1980 | Gancy et al. |
| 4,289,736 A | | 9/1981 | Lalancette |
| 4,337,126 A | | 6/1982 | Gilligan, III et al. |
| 4,357,801 A | | 11/1982 | Wahl, III |
| 4,431,615 A | | 2/1984 | Gabra |
| 4,561,945 A | | 12/1985 | Coker et al. |
| 4,882,277 A | | 11/1989 | Czytko et al. |
| 4,937,059 A | | 6/1990 | Kolts et al. |
| 5,200,046 A | | 4/1993 | Chlanda et al. |
| 5,246,551 A | | 9/1993 | Pletcher et al. |
| 5,443,804 A | | 8/1995 | Parker et al. |
| 5,595,641 A | | 1/1997 | Traini et al. |
| 5,651,875 A | * | 7/1997 | Suonpera ................ C01D 3/04 |
| | | | 205/516 |
| 5,780,005 A | * | 7/1998 | Olerud ................ C01B 33/187 |
| | | | 423/340 |
| 5,855,759 A | | 1/1999 | Keating et al. |
| 5,882,501 A | | 3/1999 | Foller et al. |
| 6,110,342 A | | 8/2000 | Mani |
| 6,200,543 B1 | | 3/2001 | Allebach et al. |
| 6,331,236 B1 | | 12/2001 | Mani |
| 6,402,818 B1 | | 6/2002 | Sengupta |
| 6,468,483 B2 | | 10/2002 | Barnett et al. |
| 6,890,497 B2 | | 5/2005 | Rau et al. |
| 7,132,090 B2 | | 11/2006 | Dziedzic et al. |
| 7,604,787 B2 | | 10/2009 | Maroto-Valer et al. |
| 7,618,606 B2 | | 11/2009 | Fan et al. |
| 7,682,589 B2 | | 3/2010 | Gorset et al. |
| 7,722,842 B2 | | 5/2010 | Park et al. |
| 7,727,374 B2 | | 6/2010 | Jones |
| 7,735,274 B2 | | 6/2010 | Constantz et al. |
| 7,744,761 B2 | | 6/2010 | Constantz et al. |
| 7,790,012 B2 | | 9/2010 | Kirk et al. |
| 7,993,500 B2 | | 8/2011 | Gilliam et al. |
| 8,088,197 B2 | | 1/2012 | Wright et al. |
| 8,114,367 B2 | | 2/2012 | Riman et al. |
| 8,177,946 B2 | | 5/2012 | Rau |
| 8,227,127 B2 | | 7/2012 | Little et al. |
| 8,268,280 B2 | | 9/2012 | Buseth et al. |
| 8,333,944 B2 | | 12/2012 | Constantz et al. |
| 8,413,420 B1 | | 4/2013 | Zaromb |
| 8,440,163 B2 | | 5/2013 | Gross-Lorgouilloux et al. |
| 8,491,858 B2 | | 7/2013 | Seeker et al. |
| 8,663,365 B2 | | 3/2014 | Willauer et al. |
| 8,764,964 B2 | | 7/2014 | Rau |
| 8,778,156 B2 | | 7/2014 | Eisaman et al. |
| 8,828,706 B2 | | 9/2014 | Rau |
| 8,936,770 B2 | | 1/2015 | Burba, III |
| 9,095,815 B2 | | 8/2015 | Riman et al. |
| 9,302,219 B2 | | 4/2016 | Stern et al. |
| 9,339,761 B2 | | 5/2016 | Jones et al. |
| 9,567,678 B2 | | 2/2017 | Eltayeb et al. |
| 9,586,181 B2 | | 3/2017 | Eisaman et al. |
| 9,643,858 B2 | | 5/2017 | Jeong et al. |
| 9,714,406 B2 | | 7/2017 | Constantz et al. |
| 9,718,731 B2 | | 8/2017 | Bullerjahn et al. |
| 9,862,643 B2 | | 1/2018 | Eisaman |
| 9,873,650 B2 | | 1/2018 | Eisaman et al. |
| 9,902,652 B2 | | 2/2018 | Devenney et al. |
| 9,914,644 B1 | | 3/2018 | Eisaman |
| 9,914,683 B2 | | 3/2018 | Eisaman |
| 10,113,407 B2 | | 10/2018 | Rau |
| 10,322,371 B2 | | 6/2019 | Constantz et al. |
| 10,413,858 B2 | | 9/2019 | Mu et al. |
| 10,632,418 B2 | | 4/2020 | Blencoe et al. |
| 10,648,091 B2 | | 5/2020 | Kuhl et al. |
| 10,711,236 B2 | | 7/2020 | Constantz et al. |
| 10,947,630 B2 | | 3/2021 | Cardarelli |
| 10,968,142 B2 | | 4/2021 | Sant et al. |
| 11,162,158 B2 | | 11/2021 | Park et al. |
| 11,247,765 B2 | | 2/2022 | Regan et al. |
| 2007/0217981 A1 | | 9/2007 | Van Essendelft |
| 2010/0051859 A1 | | 3/2010 | House et al. |
| 2011/0038774 A1 | | 2/2011 | Zhong |
| 2011/0091366 A1 | | 4/2011 | Kendall et al. |
| 2011/0147227 A1 | | 6/2011 | Gilliam et al. |
| 2011/0182786 A1 | * | 7/2011 | Burba, III ................ C25B 7/00 |
| | | | 423/90 |
| 2012/0148461 A1 | | 6/2012 | Rosenberg et al. |
| 2012/0211421 A1 | | 8/2012 | Self et al. |
| 2013/0001167 A1 | | 1/2013 | Apblett |
| 2015/0037231 A1 | | 2/2015 | Seeker et al. |
| 2015/0183653 A1 | | 7/2015 | Jung et al. |
| 2016/0312369 A1 | * | 10/2016 | Moussallem ......... C25B 11/051 |
| 2017/0240432 A1 | * | 8/2017 | Jung ........................ C22B 7/04 |
| 2018/0071675 A1 | | 3/2018 | Eisaman et al. |
| 2018/0105780 A1 | | 4/2018 | Rittmann et al. |
| 2020/0216968 A1 | | 7/2020 | Hunegnaw et al. |
| 2020/0220185 A1 | | 7/2020 | Ma et al. |
| 2020/0370001 A1 | | 11/2020 | Constantz et al. |
| 2021/0047197 A1 | | 2/2021 | Benhelal et al. |
| 2021/0129078 A1 | | 5/2021 | Regan et al. |
| 2021/0340681 A1 | | 11/2021 | Rau et al. |
| 2022/0002889 A1 | | 1/2022 | Rau |
| 2024/0002973 A1 | * | 1/2024 | Ley ........................ C01G 53/00 |
| 2024/0101440 A1 | * | 3/2024 | Cohen .................... C01F 11/46 |
| 2024/0117462 A1 | * | 4/2024 | Tunsu ....................... C02F 9/00 |
| 2024/0141510 A1 | | 5/2024 | Pham et al. |

(56) References Cited

U.S. PATENT DOCUMENTS

FOREIGN PATENT DOCUMENTS

| | | |
|---|---|---|
| CN | 114592120 | 6/2022 |
| EP | 2444507 | 4/2012 |
| JP | 6386407 | 8/2018 |
| KR | 102096900 | 2/2019 |
| WO | WO 2004/037397 | 5/2004 |
| WO | WO 2007/106883 | 9/2007 |
| WO | WO 2008/004888 | 1/2008 |
| WO | WO 2008/048103 | 4/2008 |
| WO | WO 2014/020515 | 2/2014 |
| WO | WO 2014/026637 | 2/2014 |
| WO | WO 2017/165849 | 9/2017 |
| WO | WO 2017/222396 | 12/2017 |
| WO | WO 2018/160888 | 9/2018 |
| WO | WO 2020/028980 | 2/2020 |
| WO | WO 2020/040325 | 2/2020 |
| WO | WO 2020/092273 | 5/2020 |
| WO | WO 2020/150449 | 7/2020 |
| WO | WO 2020/186178 | 9/2020 |
| WO | WO 2021/009521 | 1/2021 |
| WO | WO 2021/177823 | 9/2021 |
| WO | WO 2021/188547 | 9/2021 |
| WO | WO 2021/217261 | 11/2021 |
| WO | WO 2022/115955 | 6/2022 |
| WO | WO 2023/119017 | 6/2023 |

OTHER PUBLICATIONS

Anantharamulu et al. (2011) "A wide-ranging review on Nasicon type materials," J Mater Sci 46:2821-2837.
Aquiline (Mar. 2023) "Types of Masonry Binders," LimeWorks.us.
Astarita (1961) "Carbon dioxide absorption in aqueous monoethanolamine solutions," Chemical Engineering Science 16, 3-4, 202-207.
Azarabadi et al. (2019) "A sorbent-focused techno-economic analysis of direct air capture," Applied Energy 959-975.
De Lannoy et al. (2017) "Indirect ocean capture of atmospheric $CO_2$: Part I. Prototype of a negative emissions technology," International Journal of Greenhouse Gas Control.
De Nora (Accessed at least as early as Oct. 2022) "Electrolyzers for salt splitting," De Nora.
Eisaman et al. (2010) "$CO_2$ separation using bipolar membrane electrodialysis," Energy & Environmental Science 4, 1319-1328.
Ellis et al. (Jun. 2020) "Toward electrochemical synthesis of cement—An electrolyzer-based process for decarbonating $CaCO_3$ while producing useful gas streams," PNAS 117, 23, 12584-12591.
Fagerlund (2012) "Carbonation of $Mg(OH)_2$ in a pressurised fluidised bed for $CO_2$ sequestration," Åbo Akademi University.
Genders (1995) "Electrochemical Salt Splitting," Electrosynthesis 1, 1.
Herzog et al. (1996) "Carbon dioxide recovery and disposal from large Energy systems," Annu. Rev. Energy Environ. 21:145-66.
Holland et al. (2012) "The use of hydrated lime in concrete as a cement replacement: effect on compressive strength," Lime: Building on the 100-Year Legacy of the ASTM Committee C07. Ed. Thomson, ML, & Brisch, JH. 100 Barr Harbor Drive, PO Box C700, West Conshohocken, PA 19428-2959: ASTM International.
International Search Report and Written Opinion, dated Jul. 7, 2022, corresponding to International Application No. PCT/US2022/20796, (from which the present application claims priority,) 18 pp.
Keith et al. (2018) "A Process for Capturing $CO_2$ from the Atmosphere," Joule 2, 1573-1594.
Lackner (2009) "Capture of carbon dioxide from ambient air," Eur. Phys. J. Special Topics 176, 93-106.
Li et al. (2018) "Reaction Enthalpy Conversion in Amine Based Post-Combustion $CO_2$ Capture," Chemical Engineering Transactions, 69, 139-144 DOI: 10.3303/CET1869024.
National Lime Association Building Lime Group (2000) "Lime-based mortars Create water tight walls," National Lime Association Building Lime Group https://www.lime.org/documents/publications/free_downloads/lime-based_mortars.pdf.
Rau (2009) "Electrochemical $CO_2$ Capture and Storage With Hydrogen Generation," Science Direct 823-828.
Rheinhardt et al. (2017) "Electrochemical Capture and Release of Carbon Dioxide," ACS Energy Lett. 2, 454-461.
Romão et al. (2012) "$CO_2$ fixation using magnesium silicate minerals. Part 2: Energy efficiency and integration with iron- and steelmaking," Energy 41 203-211.
Sant (2015) "New technique could make cement manufacturing carbon-neutral," https://phys.org/news/2015-09-technique-cement-carbon-neutral.html.
Scott et al. (Feb. 2021) "Transformation of abundant magnesium silicate minerals for enhanced $CO_2$ sequestration," Communications Earth and Environment 1-6.
Sharifian et al. (Dec. 2020) "Electrochemical carbon dioxide capture to close the carbon cycle, " Energy Environ. Sci., 14, 781 814.
Shi et al. (Aug. 2020) "Moisture-Driven $CO_2$ Sorbents," Joule 4, 1823-1837.
Shi et al. (May 2020) "Sorbents for the Direct Capture of $CO_2$ from Ambient Air," Angew. Chem. Int. Ed. 59, 2-25.
Stern et al. (2013) "Post-combustion carbon dioxide capture using electrochemically mediated amine regeneration," Energy Environ. Sci., 6, 2505.
Tzanetakis et al. (2002) "Salt Splitting in a Three-compartment Membrane Electrolysis Cell," Abstract translations 31-38.
Vance et al. (2015) "Direct Carbonation of $Ca(OH)_2$ Using Liquid and Supercritical $CO_2$: Implications for Carbon-Neutral Cementation", Ind. Eng. Chem. Res. 54, 8908-8918.
Wang et al. (Feb. 2020) "$CO_2$ Capture Using Electrochemically Mediated Amine Regeneration," Ind. Eng. Chem. Res. 59, 15, 7087-7096.
Yu (2018) "Metal Recovery from Steelmaking Slag," University of Toronto 118 pp.
Partial European Search Report issued Jun. 17, 2025 in European Application No. 22772225.3.

\* cited by examiner

CARBON CAPTURE USING ELECTROCHEMICALLY-PRODUCED ACID AND BASE

CROSS-REFERENCE TO RELATED APPLICATIONS

This application is a continuation of U.S. application Ser. No. 18/548,303, filed Aug. 29, 2023, which is a U.S. National Stage Application filed under 35 U.S.C. § 371 of International Application No. PCT/US2022/020796, filed Mar. 17, 2022, which claims the benefit of and priority to U.S. Provisional Patent Application Nos. 63/162,254, filed Mar. 17, 2021, 63/173,000, filed Apr. 9, 2021, and 63/301,288, filed Jan. 20, 2022, each of which is hereby incorporated in its entirety to the extent not inconsistent herewith.

FIELD

This invention generally relates to electrochemical systems, in some embodiments more particularly to systems and methods for electrochemically (i.e., electrolytically or electrodialytically) producing acid and base solutions, and in some embodiments to systems and methods for uses of electrochemically produced acid and base solutions, including uses in carbon capture.

BRIEF DESCRIPTION OF THE DRAWINGS

The following detailed description sets forth illustrative embodiments with reference to the accompanying drawings, of which.

DETAILED DESCRIPTION

Figure 1:
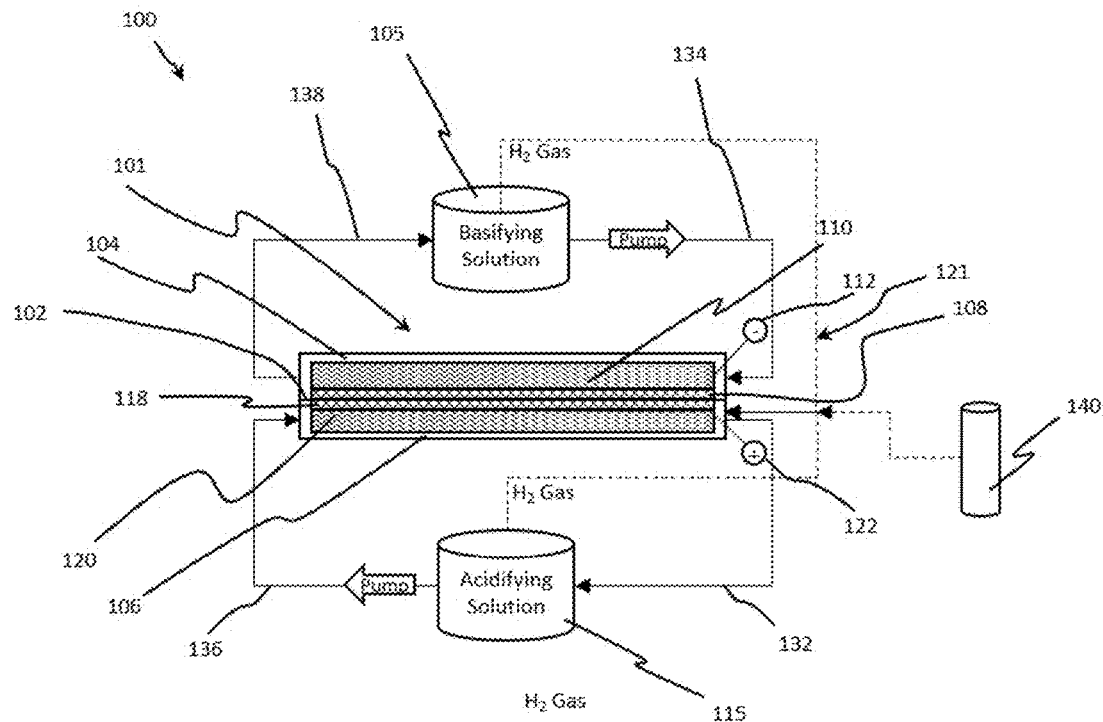
FIG. 1 is a schematic illustration of a generic acid-base generation cell.

The various embodiments will be described in detail with reference to the accompanying drawings. References made to particular examples and implementations are for illustrative purposes, and are not intended to limit the scope of the invention or the claims.

Various embodiments are provided herein for systems and methods for utilizing electrochemically produced acid and base in various environmentally-beneficial processes, including processes for removing carbon dioxide from atmospheric air, industrial waste gasses, or from ocean water. For example, some embodiments comprise producing or regenerating carbon-capture materials defined as materials capable of removing carbon dioxide from gasses or liquids.

In some embodiments, acid and base solutions produced electrochemically, preferably using substantially only energy sources that emit essentially zero greenhouse gasses, may be used to extract carbon-capture materials and other commercially valuable materials from naturally occurring ores, industrial waste materials, or other source materials containing elements such as silica, iron, magnesium, calcium, aluminum, or others. For example, in various embodiments, commercially valuable materials containing silica, iron, magnesium, calcium, aluminum, titanium, or other elements may be recovered in relatively pure form which may be further purified in subsequent processes to produce raw materials or products made of those materials. Such commercially valuable raw materials may include one or more grades of steel. In some embodiments iron hydroxide may be extracted and subsequently converted into iron or steel products through use of a hydrogen direct reduction process and/or an electric arc furnace process. In some embodiments, magnesium hydroxide and/or calcium hydroxide may be extracted and subsequently used as carbon-capture and sequestration materials. In some embodiment, amorphous silica, aluminum (or aluminum hydroxide), titanium or titanium hydroxide, or other materials may be extracted and used in a variety of applications and products.

As used herein, the terms "electrochemical acid-base generator" may inclusively refer to both electrolytic acid-base generation cells (or multi-cell-stacks) and to electrodialytic acid-base generation cells (or multi-cell-stacks) as each of those is defined and described herein. Similarly, "electrochemically-produced acid and base" may refer to acid and base solutions produced using either electrolytic acid-base generation cells or electrodialytic acid-base generation cells. In still other embodiments, acid and base solutions used in various systems and processes herein may be produced by other methods or combinations of methods, such as chemical processes, thermal processes, etc.

As used herein, the term "electrolytic acid-base generator" refers to a device or system in which a salt solution is split into its constituent acid and base through anodic oxidation reactions and cathodic reduction reactions under electrical polarization due to an applied electrical voltage or current. Each electrolytic cell may comprise two, three, or more chambers (also referred to synonymously herein as "compartments"), which may be separated from one another by one or more separator membranes such as anion-exchange membranes (AEMs), proton exchange membranes (PEMs), cation exchange membranes (CEMs), microporous separator membranes, electrodes, membrane electrode assemblies (MEAs), or other structures. Electrolytic acid-base generators may comprise one or more electrolytic cells in any combination of monopolar or bipolar stack configurations. Some particular example cell and/or stack configurations are shown and described herein, but other configurations may also be used in combination with various embodiments employing produced acid and base solutions in making other products or process results.

As used herein, the term "electrodialytic acid-base generator" refers to a device or system which combines electrodialysis of a salt solution with electrodialytic water splitting for the conversion of an aqueous salt solution into corresponding acid and base solutions. An electrodialytic acid base generator may typically include multiple PEM (or CEM) and AEM membranes and one or more bipolar membranes (a bilayer of a PEM or CEM and an AEM) separating liquid chambers from one another and facilitating separation of ions to form the acid and base.

Electrolytic acid-base generation systems have an advantage over electrodialytic acid-base generators in that electrolytic systems may be operated at a much wider range of current density, which allows for better integration with intermittent renewable energy sources, such as wind, solar, and tidal power. Because renewable energy sources depend on variable environmental conditions to produce power they tend to produce intermittent power with periods of relatively high power generation and periods of relatively low power generation. Because electrolytic acid-base generators may be driven at a wide range of current densities, they may be "turned down" to operate at lower current densities (or shut down) during periods of low power generation, and may be "turned up" to operate at higher current densities during periods of higher power generation. In some embodiments of the systems and methods herein, acid and base produced by an acid-base generation system may be stored in separate respective tanks (or other suitable storage vessels). This allows a system to generate more acid and base during periods of high power generation and less acid and base during periods of low power generation while having an available supply of stored acid and base for any of the various application processes described herein. In this way, the stored acid and base represent a method of storing the energy used to produce them from a salt. The use of the acid and base may thereby be decoupled from their production, such that the acid and base may be produced at times and in locations optimal for renewable energy consumption but used at different times or in different locations optimal for particular uses.

In some embodiments, a method comprises making an aqueous salt solution (e.g., a clean aqueous salt solution) by dissolving a salt in relatively pure water (e.g., filtered, microfiltered, or de-ionized water), dividing the aqueous salt solution into an acidifying solution volume and a basifying solution volume, driving the acidifying solution volume and the basifying solution volume through an electrochemical acid-base generator to acidify (lower the pH by forming an acid in) the acidifying solution volume to produce an acid solution and to basify (raise the pH by forming a base in) the basifying solution volume to form a base solution, mixing a volume of seawater (typically having a pH around 8) with a volume of the acid solution sufficient to produce an acidified seawater solution with a pH of between 3 and 5, removing $CO_2$ gas from the acidified seawater solution to produce a decarbonized acidified seawater solution, mixing a volume of the decarbonized acidified seawater solution with a volume of the base solution sufficient to produce a decarbonized seawater solution with a pH of 7.5 to 8.5, or about 8.0, and returning a volume of the decarbonized seawater solution to a body of water, such as an ocean or other earth-surface or subterranean body of water. As used herein, the term "seawater" is used to refer to any body of saltwater, including oceans, seas, and/or salt-lakes present on a planet's surface and/or under a planet's surface (e.g., earth-surface and/or subterranean).

In various embodiments, removing CO2 gas from the acidified seawater may comprise any suitable gas-liquid separation technique or apparatus, including vacuum separation, gas stripping, cyclonic (or centrifugal) separators, gravitational separators, filter vane separators, expansion chambers, liquid/gas coalescer membrane materials, or other mechanisms, or any combination thereof.

In some embodiments, instead of creating a clean aqueous salt solution from purified water (e.g., de-ionized water), seawater may be used as an acidifying solution and/or a basifying solution in an electrochemical acid-base generator. In some such embodiments, the seawater may be filtered and/or otherwise treated before being directed into an acid-base generator. In other embodiments, a solution of concentrated desalination brine (e.g., produced as a byproduct of a desalination process) may be used alternatively or additionally as an acidifying solution and/or a basifying solution in an acid-base generator. In various embodiments, seawater and/or desalination brine may be diluted with an additional source of fresh water (filtered, deionized, or otherwise).

Various embodiments are also provided herein for systems and methods for electrochemically generating aqueous acid and base solutions from manufactured, aqueous salt solutions (i.e., salt solutions prepared from pure water or substantially pure water, such as de-ionized water), naturally occurring aqueous salt solutions (e.g., naturally occurring seawater or brackish water), or purified aqueous salt solutions (e.g., purified seawater or brackish water, or concentrated brine from a desalination facility). Such systems are generally referred to herein as electrochemical acid-base generators or more generically as a "reactor." As used herein, the abbreviation "ABG" refers generically to an electrochemical acid base generator (i.e., either electrolytic or electrodialytic) unless otherwise specified.

When an acid such as hydrochloric acid (HCl) is reacted with a base such as sodium hydroxide (NaOH), the reaction generates a salt, sodium chloride (NaCl) and water H2O, according to the equation:

$$HCl + NaOH \rightarrow NaCl + H_2O \quad (EQ. 1)$$

This reaction is spontaneous, easy and fast. On the other hand, the reverse reaction is not spontaneous, and energy must be applied to split a salt into corresponding acid and base solutions. Prior attempts at electrochemical generation include the use of so-called "bipolar" membranes made up of a cation exchange membrane (also referred to herein as a "proton exchange membrane" or PEM) laminated or otherwise joined to an anion exchange membrane (AEM). Due to the generally high resistance of the multilayer bipolar membranes, the devices have relatively high overall electrical resistance and are typically limited to low current densities (e.g., about 10 mA/cm$^2$). Bipolar membranes have generally been used to directly remove dissolved inorganic carbon from seawater electrochemically. Such systems are complex and costly to operate. Nonetheless, bipolar membrane systems (also known as electrodialysis systems) have been used to produce concentrated acid and base streams from an input salt solution. Therefore, acid and base streams used in some embodiments of methods and systems described herein may be produced by electrodialysis/bipolar membrane cells in place of or in addition to acid and base produced by an electrolytic acid base generator as described herein.

Other prior art systems describe electrolytic salt splitting through anodic oxidation and cathodic reduction of salt solutions. One of the most common examples includes the chlor-alkali process in which a sodium-chloride or potassium chloride brine solution is split into an alkali (base) solution and a gaseous chlorine stream. In some cases, the chlorine gas is reacted the hydrogen produced at the cathode of the chlor-alkali system to produce an acid (HCl). Other electrolytic systems for splitting salts into acid and base streams are also known in the prior art.

The electrolytic acid-base generation systems and methods described herein may be built and operated cost-effectively by recirculating solutions between a stack of low-cost electrolytic reaction cells and separate acidifying solution and basifying solution storage vessels. Such systems may be uniquely configured to operate at relatively high current densities (>=100 mA/cm$^2$) by using relatively low-resistance cells and efficient electrodes, thereby allowing for cost-effective operation. The various embodiments herein include systems utilizing either anion exchange membranes (AEM) or proton exchange membranes (PEM), but generally avoiding the costly approach of bipolar membranes.

Figure 6:
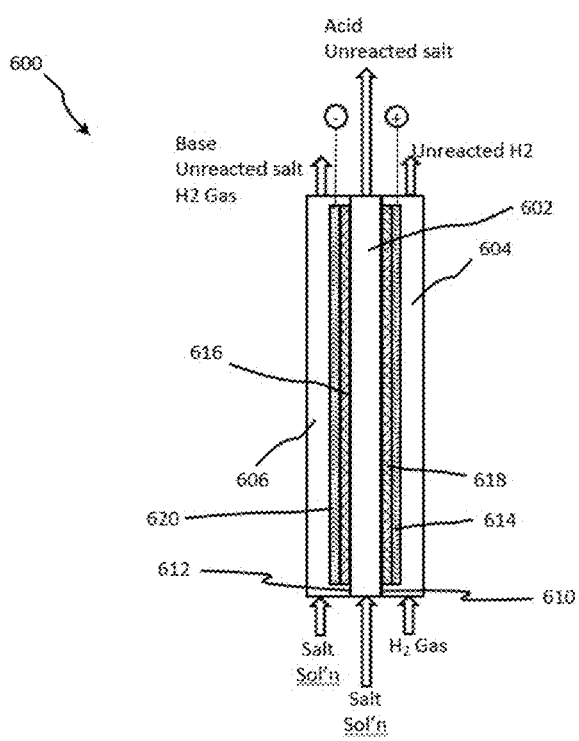
FIG. 6 is a schematic illustration of a three-chamber acid-base generation cell.
Figure 7:
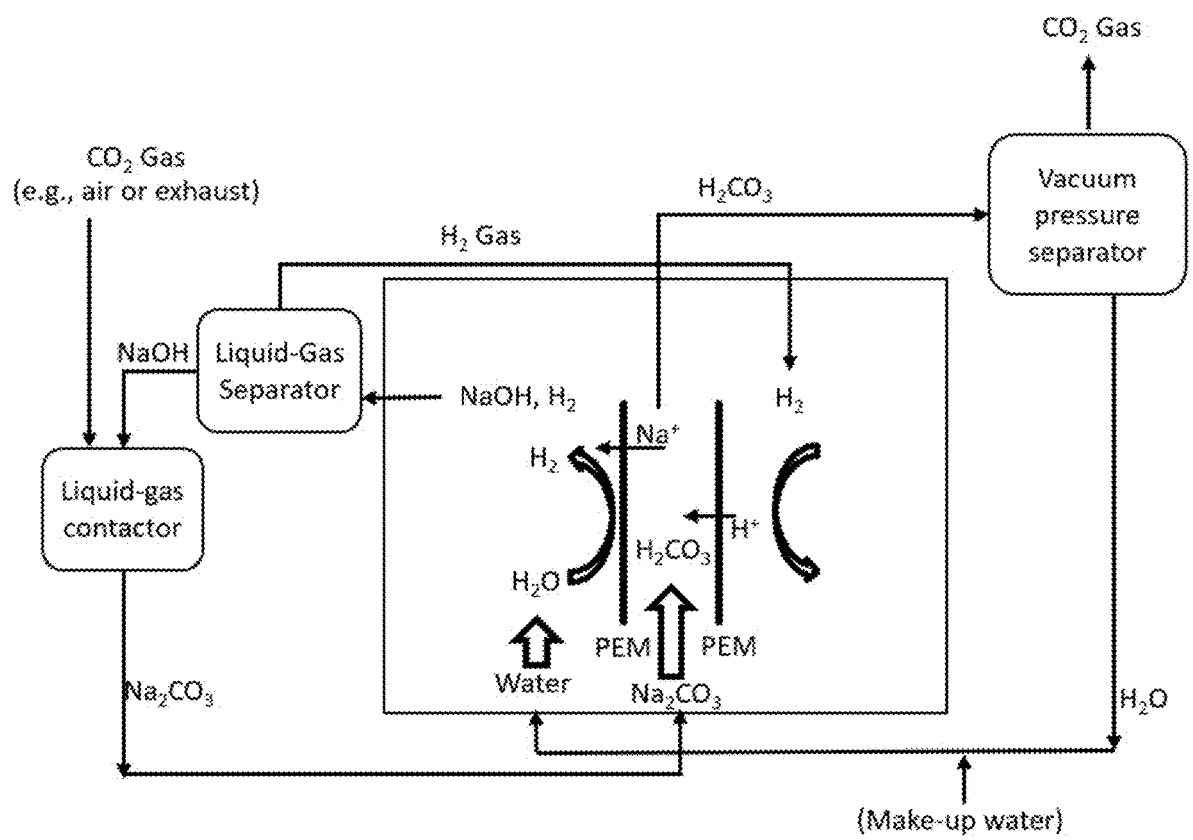
FIG. 7 is a schematic diagram illustrating an electrolytic acid base generation system configured for contacting a $CO_2$ capture liquid (e.g., NaOH) with $CO_2$ gas to produce sodium carbonate, to produce carbonic acid from the sodium carbonate, and further incorporating a system for extracting pure $CO_2$ gas from the carbonic acid.

As used herein, the term "acid-concentrating chamber" refers to an electrochemical cell chamber in which an acidifying solution decreases in pH, thereby increasing in acid concentration. Similarly, the term "base-concentrating chamber" refers to an electrochemical cell chamber in which a basifying solution increases in pH, thereby increasing a base concentration. In a two-compartment acid-base generating electrolytic cell, such as those shown in FIG. 1, FIG. 2, FIG. 3, FIG. 4, and FIG. 5, the "anode chamber" is the acid-concentrating chamber, and the "cathode chamber" is the base-concentrating chamber. In the case of a three-chamber electrolytic acid-base generating cell as shown in FIG. 6 and FIG. 7, the cathode chamber is the base-concentrating chamber, the "middle" or "center" chamber is the acid-concentrating chamber, and the anode chamber may contain substantially only a depolarizing gas to be oxidized (i.e., the anode chamber may be similar to a fuel cell chamber). Therefore, in reference to two-chamber and three-chamber electrolytic cells, the terms "cathode chamber" and "base concentrating chamber" may be used interchangeably. In reference to two-chamber electrolytic cells, the terms "anode chamber" and "acid-concentrating chamber" may be used interchangeably. In reference to three-chamber cells, the terms "middle chamber," "center chamber," and "acid-concentrating chamber" may be used interchangeably.

FIG. 1 schematically illustrates an electrolytic acid-base generation system 100, which may be configured to operate with either an AEM or a PEM separator membrane. In either case, the system may be configured to circulate an "acidifying solution" liquid and a "basifying solution" liquid through an electrolytic reactor in which constituents of the liquids are treated to convert a portion of the acidifying solution liquid into an acid and a portion of the basifying solution liquid into a base.

In various embodiments, one or both of the acidifying solution and the basifying solution may comprise an aqueous solution including one or more dissolved salts. Some examples are described herein with reference to electrolytes containing dissolved sodium chloride salt, yielding sodium cations and chloride anions. Other salts may also be used alone or in combination. For example, in various embodiments the acidifying solution and/or basifying solution may comprise anions and cations from any one salt or combination of salts, such as sodium chloride (NaCl), sodium sulfate (Na$_2$SO$_4$), sodium carbonate (Na$_2$CO$_3$), sodium nitrate (NaNO$_3$), sodium acetate (CH$_3$COONa), sodium citrate (Na$_3$C$_6$H$_5$O$_7$) sodium maleate (C$_4$H$_3$O$_4$Na), sodium oxalate (Na$_2$C$_2$O$_4$) one or more sodium phosphates (including hydrous and anhydrous forms of any di- or polyphosphate), potassium chloride (KCl), potassium sulfate (K$_2$SO$_4$), potassium carbonate (K$_2$CO$_3$), potassium nitrate (KNO$_3$), potassium acetate (CH$_3$COOK), potassium citrate (K$_3$C$_6$H$_5$O$_7$), potassium maleate (C$_4$H$_3$O$_4$K), potassium oxalate (K$_2$C$_2$O$_4$), lithium salts including lithium chloride, lithium sulfate, lithium nitrate, lithium acetate, lithium oxalate, or any other organic or inorganic salts or combinations of salts. In some embodiments, the quantity of salt to be used may be selected based on a desired acid and/or base concentration to be produced. Therefore, in various embodiments, an acidifying solution and/or a basifying solution may have a salt concentration of about 0.1 M to about 5 M, or in some embodiments up to the saturation limit for the given salt (e.g., NaCl has a room-temperature solubility limit of about 6.2 M). In other embodiments, salt concentrations for an acidifying solution and/or a basifying solution may be selected based on a concentration ratio sufficient to encourage cross-separator transfer of a preferred ion (cation or anion) in favor of a more ionically-mobile ion.

The system 100 generally comprises at least one electrolytic cell 101 which may include a separator membrane 102 dividing the cell 101 into a cathode chamber 104 and an anode chamber 106. The cathode chamber 104 may contain a cathode electrode 108 and current collector 110 connected to a negative terminal 112, and the anode chamber 106 may contain an anode electrode 118 and current collector 120 connected to a positive terminal 122. The cathode chamber 104 may further include a fluid inlet into which a "basifying solution" solution may flow and a fluid outlet through which basifying solution may exit after treatment in the cathode chamber 104. The basifying solution may be stored in a basifying solution vessel 105 which may have a volume many times larger than the cell 101 (or collection of cells).

Similarly, the anode chamber 106 may include a fluid inlet into which an "acidifying solution" solution may flow and a fluid exit outlet through which acidifying solution may exit after treatment in the cathode chamber 106. The acidifying solution may be stored in an acidifying solution vessel 115 which may have a volume many times larger than the cell 101 (or collection of cells). Acidifying solution and basifying solution may flow into the cell via respective in-flow conduits 136, 134 and after exiting the cell 101 may be returned to the respective vessels 115, 105 via return conduits 132, 138. In some embodiments, the basifying solution and acidifying solution may be circulated by respective pumps and/or other flow control devices. In various embodiments, the acidifying and basifying solutions may be configured to flow through an acid base generator (of any type or configuration described herein) in the same direction (co flow) or in the opposite direction (counter flow) in the cell.

As the acidifying solution and basifying solution (and in some cases a gaseous reactant such as hydrogen) flow through the cell, an electrical current applied to the electrodes will typically cause electrolytic reactions modifying ions in the liquids, resulting in an increase in concentration of a basifying solution product (i.e., a base solution) and a corresponding increase in concentration of an acidifying solution product (i.e., an acid solution). As will be further described below, the acidifying solution exiting the anode chamber 106 will typically contain an increased concentration of the acidic anode product in addition to a decreased concentration of un-reacted components of the supplied acidifying solution. Similarly, the basifying solution exiting the cathode chamber 104 will typically contain an increased concentration of the basic anode product in addition to a decreased concentration of un-reacted component of the supplied basifying solution.

According to some embodiments, the intended electrochemical reaction at the cathode involves water-splitting to produce hydrogen gas and hydroxyl ions according to the equation:

$$\text{Cathode: } H_2O + e^- \rightarrow \tfrac{1}{2}H_2 + OH^- \quad \text{(EQ. 2)}$$

Figure 2:
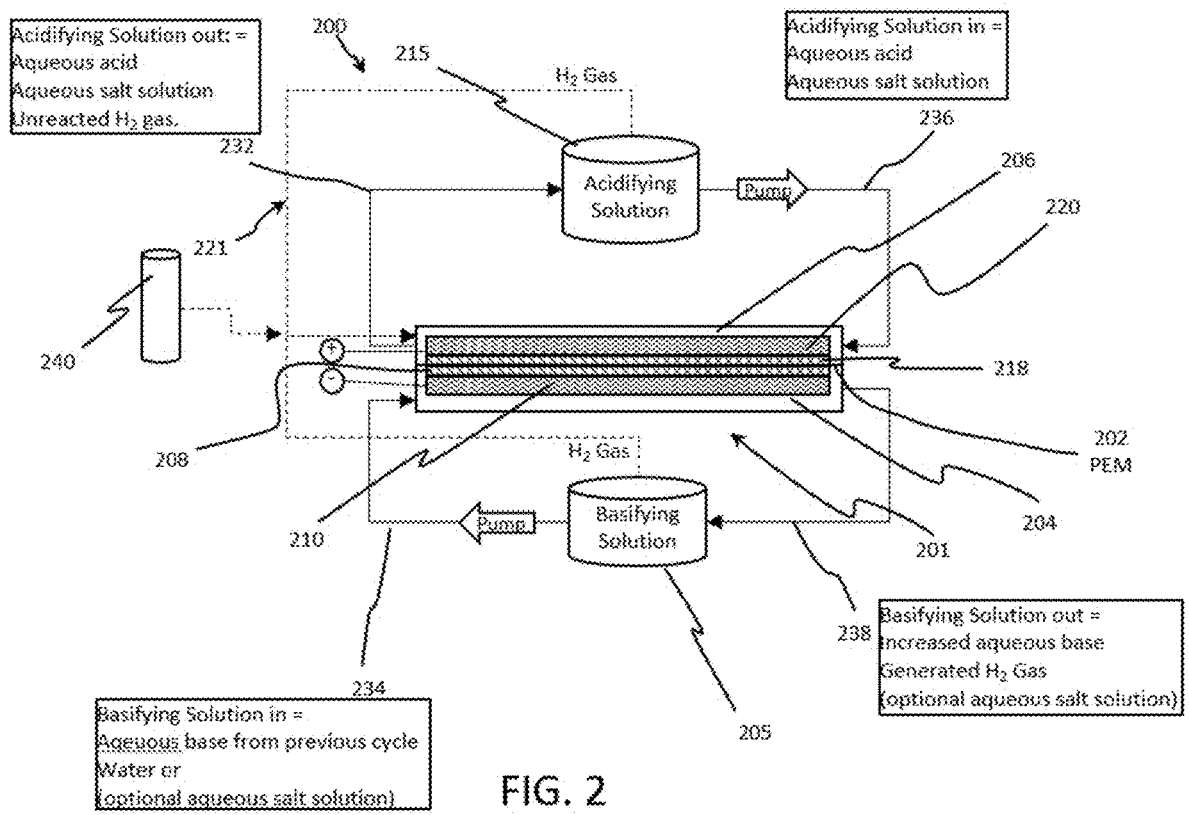
FIG. 2 is a schematic illustration of an acid-base generation cell utilizing a proton exchange membrane (PEM).
Figure 3:
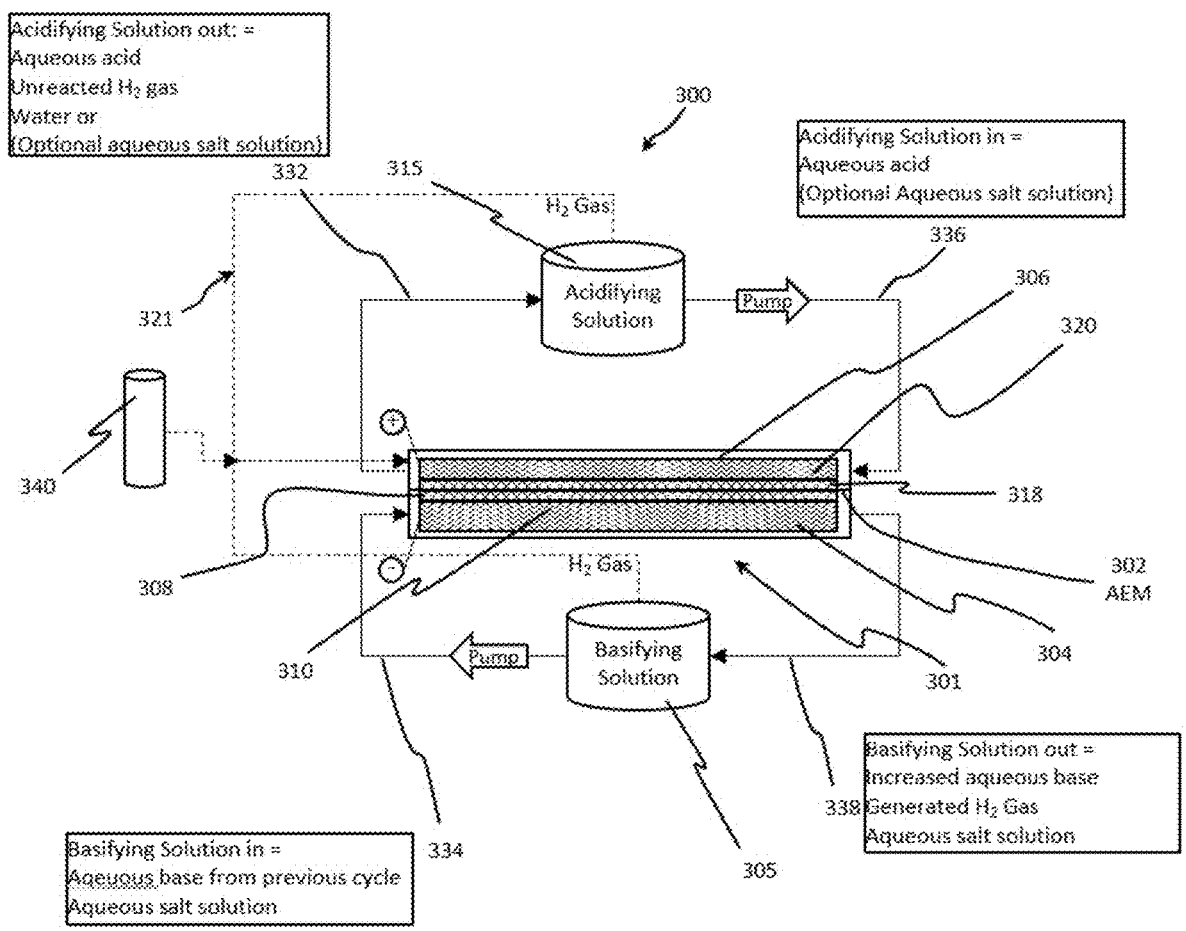
FIG. 3 is a schematic illustration of an acid-base generation cell utilizing an anion-exchange membrane (AEM).

The system may comprise hydrogen gas circulation conduits 121 which may collect hydrogen gas produced in the cathode chamber 104 and direct the collected hydrogen gas along with an optional supplemental hydrogen gas from a hydrogen source 140 into the anode chamber 106 of the cell 101. While FIG. 1-FIG. 3 schematically illustrate introduction or injection of hydrogen gas directly into the anode chamber of the cell, the hydrogen gas may be introduced or injected into the acidifying solution at any point between an acidifying solution tank and the anode chamber(s) of the cell or cell-stack. For example, in some embodiments, the hydrogen gas may be injected into an acidifying solution conduit upstream of the cell or cell-stack. In various embodiments, hydrogen gas may be mixed into the acidifying solution by a sparger and/or other gas-liquid mixing device. Such hydrogen injection and/or mixing methods and systems may be used in combination with any of the embodiments described herein.

In embodiments configured to consume gaseous hydrogen at the anode, the intended electrochemical reaction at the anode may comprise hydrogen oxidation in which hydrogen gas is oxidized to form protons according to the equation:

$$\text{Anode: } H_2 \rightarrow 2H^+ + 2e^- \quad \text{(EQ. 3)}$$

One or both of the acidifying solution and the basifying solution may comprise an aqueous solution having anions and cations from one or more dissolved salts. Depending on the ion selectivity of the separator membrane, either the salt anion or the salt cation may pass through the separator membrane and interact with species in the opposite chamber. Examples of such systems with PEM and AEM membranes are described in the following sections.

Proton Exchange Membrane (PEM) Acid Base Generation Systems

FIG. 2 illustrates an example electrolytic acid base generation system in which the separator membrane (102 of FIG. 1) is a PEM 202. The PEM may comprise any polymer suited to selectively conducting cations (positively charged ions) through the membrane, but otherwise substantially preventing conduction of anions, and electrons.

In one embodiment of a PEM electrolytic ABG system 200, the basifying solution may comprise water (e.g., deionized water, municipal water, raw water or other degree of purity, or any combination thereof), or a solution containing a dissolved salt, optionally including a concentration of base (e.g., from a previous cycle through the reactor). The acidifying solution may comprise an aqueous salt solution such as those described herein. For the purpose of description, an example is given in which one or both of the acidifying solution and basifying solution comprises dissolved sodium chloride. Therefore, in the example below, the salt cation is sodium, and the salt anion is chloride. As will be clear from the description herein, any other salt or combination of salts may be used in place of or in addition to sodium chloride.

While in some embodiments it is possible for the basifying solution to be only water, doing so may create an osmotic pressure across the separator membrane. In response to such an osmotic pressure, water may migrate across the separator membrane, diluting the salt solution in the acidifying solution. Therefore, it may be advantageous to make a single aqueous salt solution that is divided into acidifying solution and basifying solution volumes. In some embodiments, the aqueous salt-solution may be made by dissolving a salt (e.g., one or more of the salts described herein) in relatively pure water. In various embodiments, the relatively pure water may comprise filtered municipal water, micro-filtered water, de-ionized water, de-salinated water, other sources of relatively pure water, or any combination thereof). Making such a clean salt solution may minimize challenges with scaling and other contaminants.

In some embodiments, both the acidifying solution and the basifying solution contain a dissolved salt or combination of salts. In some such embodiments, the acidifying solution and basifying solution may contain the same salt or combination of salts, while in other embodiments the acidifying solution and basifying solution may each contain a different dissolved salt or combination of salts. In this way, the acid and base produced by the system need not necessarily be from the same salt. In some embodiments, both the acidifying solution and the basifying solution may comprise seawater and/or brackish water with minimal or no filtration to remove solids, but without the need to desalinate or substantially desalinate. This may allow for relatively low-cost operation in locations adjacent to seawater and/or brackish water sources. In some embodiments, the acidifying solution entering the electrolytic cell 200 comprises aqueous acid and aqueous salt solution. In some embodiments, the basifying solution entering the electrolytic cell 200 comprises aqueous base from a previous cycle, water, and optionally aqueous salt solution. As described herein, the acidifying solution and basifying solution may have different concentrations of (the same or different) salts in order to encourage one or more preferred ions to cross a separator instead of a less-preferred ion (e.g., $Na^+$ instead of H⁺ in some examples described herein). In such cases, the ratio of the salt concentrations should be equal to or greater than a ratio of the ionic mobility of the less-preferred ion to the ionic mobility of the preferred ion through the separator between the salt solutions (assuming the less-preferred ion has a greater ionic mobility through the separator than the preferred ion).

As an electrical current is applied to the electrolytic cell 200, the reactions of EQ 2 and EQ 3 will typically be driven at the cathode and anode respectively. The protons (H⁺) produced at the anode 218 by EQ 3 naturally combines with the salt anions (e.g., Cl⁻) in the acidifying solution to form an acid (e.g., HCl).

In order to complete the electrical circuit in the cell, a cation must cross the PEM separator from the cathode chamber into the anode chamber. Preferably, the salt cation (e.g., Na⁺) is the predominant species to cross the PEM separator into the cathode chamber. In the cathode chamber, the hydroxyl (OH⁻) anions produced at the cathode 208 by EQ 2 will typically naturally combine with the salt cations (e.g., Na⁺) in the basifying solution, thereby forming a base (e.g., sodium hydroxide, NaOH).

When the acidifying solution exits the anode chamber, it will typically contain a decreased (but typically non-zero) concentration of un-reacted salt ions, an increased concentration of acid, and possibly a quantity of un-reacted hydrogen gas (unless hydrogen gas is flowed to the anode independent of any liquid as in some cell configurations shown and described herein). In this regard, the exiting acidifying solution typically comprises an aqueous acid, aqueous salt solution, and unreacted H₂ gas. The hydrogen gas may be separated from the liquid acidifying solution by any suitable gas-liquid separation mechanism, including vacuum separation, gas stripping, cyclonic (or centrifugal) separators, gravitational separators, filter vane separators, expansion chambers, liquid/gas coalescer membrane materials, or other mechanisms, or any combination thereof. In some embodiments, hydrogen may simply be allowed to collect at an upper portion of the acidifying solution storage vessel 215, from which it may be extracted. Separated hydrogen gas may then be returned to the anode chamber via hydrogen transport conduits 221 and/or to a hydrogen storage vessel 240. The acidifying solution exiting the anode chamber may be sent to the storage vessel 215, and may subsequently be returned to the anode chamber from the storage vessel 215 in a continuously recirculating mode where the solution continues to enrich in acid with each cycle through the acid base generator until it reaches a desired acid concentration.

When basifying solution exits the cathode chamber, the aqueous solution will typically include an increased concentration of base (e.g., aqueous base) and will typically carry a quantity of hydrogen gas produced by the cathode. In this regard, the exiting basifying solution typically comprises increased aqueous base, generated H₂ gas, and optional aqueous salt solution. The hydrogen gas may be separated from the liquid basifying solution by any suitable gas-liquid separation mechanism, including vacuum separation, gas stripping, cyclonic (or centrifugal) separators, gravitational separators, filter vane separators, expansion chambers, liquid/gas coalescer membrane materials, or other mechanisms, or any combination thereof. In some embodiments, hydrogen may simply be allowed to collect at an upper portion of the basifying solution storage vessel 205, from which it may be extracted. Separated hydrogen gas may then be returned to the anode chamber via hydrogen transport conduits 221 or to a hydrogen storage vessel 240. The basifying solution exiting the cathode chamber may be sent to the storage vessel 205, and may then be returned to the cathode chamber from the storage vessel 205 in a continuously recirculating mode where the solution continues to enrich in base with each cycle through the acid base generator until it reaches a desired base concentration.

In embodiments in which the basifying solution is predominantly or only water, the produced aqueous base solution may be substantially free of remaining salt ions. Such a "pure" base solution may be used in applications demanding minimal contaminants.

Any protons (H⁺) that cross the PEM separator into the cathode chamber instead of or in addition to the salt cations (e.g., Na⁺) will typically combine with OH⁻ to make water in the cathode chamber. Such a reaction represents an energy inefficiency because it reverses the effect of the reactions driven by electrical current applied to the electrodes. This type of inefficiency, in which an un-desired ion crosses a separator, will be referred to herein as a "crossover inefficiency." Another form of crossover inefficiency would be hydroxyl (OH⁻) anions crossing from the cathode chamber through the PEM separator into the anode chamber. While current cation exchange separator membranes are designed to preferentially conduct cations, some conduction of anions (referred to as anion "leakage") is still possible and would result in crossover inefficiency.

One approach to mitigating crossover inefficiency is to provide a sufficient concentration of salt cations in the acidifying solution that the probability of protons crossing the separator is adequately suppressed. The propensity of a given cation species to cross the PEM separator is a function of the ion's mobility in combination with the relative concentration of the cation (availability). Using the above example, the ionic mobility of a proton (H⁺) is about seven times greater than that of a sodium ion (Na⁺). Therefore, if the concentration of the desired salt cation in the acidifying solution is greater than the expected proton concentration in the acidifying solution by more than the ratio of their ionic mobilities, the desired salt cation will be more likely to cross the separator than the proton and the desired salt cation will contribute to more than 50% of the current at all concentration ranges considered. In this example, if the concentration of sodium in the acidifying solution is more than 7 times the desired concentration of acid (i.e., of protons (H⁺)), then it becomes more likely that a sodium cation will cross the PEM than a proton, and sodium will contribute to more than 50% of the current.

In some embodiments, proton crossover inefficiency in a PEM electrolytic ABG may be mitigated by adding a layer of porous material between the anode electrode and the PEM separator to increase the diffusion length for protons generated at the anode to travel before reaching the PEM separator. Salt cations present in the porous layer will have a shorter diffusion path length to travel before reaching the PEM separator, thereby further decreasing the possibility of protons crossing the PEM separator. The competition between protons and the salt cations may be further tilted in favor of the salt cations by promoting electrolyte flow through the chamber as further described below. Some examples of suitable porous material layers are described in more detail below with reference to FIG. 4.

The above methods will typically mitigate inefficiency due to crossover of an undesired cation but typically will not directly address inefficiency due to possible anion leakage due to conduction of OH⁻ from the cathode chamber into the anode chamber. In some embodiments, this mode of PEM anion crossover inefficiency may be addressed (and PEM cation crossover inefficiency may be further mitigated) by adding an additional porous layer onto the cathode side of the PEM separator to further increase the diffusion length for anions generated at the cathode. This increased diffusion path typically will also contain salt cations having crossed the PEM from the anode chamber. Increasing the cathode-side diffusion path length for anions generated at the cathode makes them less likely to reach and leak through the PEM separator. Therefore, in some embodiments, porous layers may be provided on both sides of a PEM separator. In some embodiments, a porous layer on a cathode side of a PEM separator may be thinner than a porous layer on an anode side of a PEM separator.

The schematic electrolytic cell 100 of FIG. 1 is shown with the planar surfaces of the electrodes and separator oriented in a horizontal direction. For efficient hydrogen oxidation on the anode, it may be important to efficiently deliver hydrogen to the anode surface where active catalysts are located. Therefore, in some embodiments, at least an anode electrode may be oriented non-vertically within an electrolytic acid base generator cell. For example, with the anode oriented horizontally, hydrogen gas injected into the anode chamber will tend to move upwards through the acidifying solution due to buoyancy and will naturally reach the anode surface, thereby providing the anode access to the hydrogen gas reactant. The cell may also be tilted versus the horizontal to facilitate the gas to flow upward along the anode to prevent accumulation of gas pockets in or near the electrode. In various embodiments, the cell may be tilted at an angle of anywhere from greater than 0° to less than 90°, such as 10 to 89°, 30-60°, or about 45°, relative to the horizontal (defined as normal to the direction of gravity). In various embodiments, the entire cell or cell-stack may be inclined at an angle or only the anode electrode may be arranged to have a non-zero angle versus either the vertical or horizontal lines. In still other embodiments, additional gas-directing features may be incorporated into the anode chamber or the anode itself in order to direct injected hydrogen gas to the anode electrode. Such structures may include angled vanes, three-dimensional flow-through anode electrode structures such as felts or foams, or others.

Anion Exchange Membrane (AEM) Acid Base Generation Systems

FIG. 3 illustrates an example of an electrolytic acid base generation system in which the separator membrane (102 of FIG. 1) is an AEM 302. The electrolytic cell 300 contains an anion exchange membrane (AEM) 302 that preferentially conducts anions, which refers to negatively charged ions.

In one embodiment of an AEM electrolytic ABG system 300, the acidifying solution may comprise water (e.g., deionized water, municipal water, raw water or other degree of purity, or any combination thereof), optionally including a concentration of acid (e.g., from a previous cycle through the reactor). In some embodiments, the acidifying solution entering the electrolytic cell 300 comprises aqueous acid and optionally aqueous salt solution.

In some embodiments, the basifying solution may comprise an aqueous salt solution such as those described herein. For the purpose of description, an example is given in which the basifying solution comprises dissolved sodium chloride and therefore contains sodium cations and chloride anions. As in the PEM case, in some embodiments of AEM electrolytic ABG systems both the acidifying solution and the basifying solution may contain dissolved salt ions from the same salt or different salts, including brackish water and/or seawater with the same concentrations or with different concentrations. In some embodiments, the basifying solution entering the electrolytic cell 300 comprises aqueous base from a previous cycle and aqueous salt solution.

As an electrical current is applied to the electrolytic cell 300, the reactions of EQ 2 and EQ 3 will be driven at the cathode and anode respectively. In the cathode chamber, the hydroxyl ($OH^-$) anion produced at the cathode 308 will naturally combine with the salt cations (e.g., $Na^+$) present in the basifying solution, to form a base (e.g., sodium hydroxide, NaOH).

In order to complete the electrical circuit in the cell, an anion typically must cross the AEM separator from the cathode chamber into the anode chamber. Preferably, the salt anion (e.g., $Cl^-$) is the predominant species to cross the separator into the anode chamber. In the anode chamber, the protons ($H^+$) produced at the anode 318 by EQ 3 will naturally combine with the salt anions (e.g., $Cl^-$) in the acidifying solution, to form an acid (e.g., HCl).

When the acidifying solution exits the anode chamber, it typically will contain an increased concentration of acid and a quantity of un-reacted hydrogen gas. In this regard, the exiting acidifying solution typically comprises aqueous acid, unreacted $H_2$ gas, and water or optionally aqueous salt solution. The hydrogen gas may be separated from the liquid acidifying solution by any suitable gas-liquid separation mechanism, including vacuum separation, gas stripping, cyclonic (or centrifugal) separators, gravitational separators, filter vane separators, expansion chambers, liquid/gas coalescer membrane materials, or other mechanisms, or any combination thereof. In some embodiments, hydrogen may simply be allowed to collect at an upper portion of the acidifying solution storage vessel 315, from which it may be extracted. Separated hydrogen gas may then be returned to the anode chamber via hydrogen transport conduits 321 and/or to a hydrogen storage vessel 340. The acidifying solution exiting the anode chamber may be sent to the storage vessel 315, and may subsequently be returned to the anode chamber from the storage vessel 315 in a continuously recirculating mode where the solution continues to enrich in acid with each cycle through the acid base generator until it reaches a desired acid concentration.

In embodiments in which the acidifying solution is predominantly or only water, the produced aqueous acid solution may be substantially free of remaining salt ions. Such a "pure" acid solution may be used in applications demanding minimal contaminants.

When basifying solution exits the cathode chamber, the aqueous solution typically will include a decreased (but typically non-zero) concentration of un-reacted salt ions, an increased concentration of base and typically will carry a quantity of hydrogen gas produced by the cathode. In this regard, the exiting basifying solution typically comprises increased aqueous base, generated $H_2$ gas, and aqueous salt solution. The hydrogen gas may be separated from the liquid basifying solution by any suitable gas-liquid separation mechanism, including vacuum separation, gas stripping, cyclonic (or centrifugal) separators, gravitational separators, filter vane separators, expansion chambers, liquid/gas coalescer membrane materials, or other mechanisms, or any combination thereof. In some embodiments, hydrogen may simply be allowed to collect at an upper portion of the basifying solution storage vessel 305, from which it may be extracted. Separated hydrogen gas may then be returned to the anode chamber via hydrogen transport conduits 321 and/or to a hydrogen storage vessel 340. The basifying solution exiting the cathode chamber may be sent to the storage vessel 305, and may then be returned to the cathode chamber from the storage vessel 305 in a continuously recirculating mode where the solution continues to enrich in base with each cycle through the acid base generator until it reaches a desired base concentration.

Any hydroxyl ions ($OH^-$) that cross the AEM separator into the anode chamber instead of or in addition to the salt anions (e.g., $Cl^-$) typically will combine with protons ($H^+$) to make water in the anode chamber. Such a reaction represents an energy inefficiency because it reverses the effect of the reactions driven by electrical current applied to the electrodes ("crossover inefficiency"). Another form of crossover inefficiency would be protons ($H^+$) crossing from the anode chamber through the AEM separator into the cathode chamber. While current anion exchange separator membranes are designed to preferentially conduct anions, some conduction of cations is still possible and would result in crossover inefficiency.

One method of mitigating unwanted crossover inefficiency in an AEM electrolytic ABG is to provide a sufficient concentration of salt anions in the basifying solution that the probability of hydroxyl anions ($OH^-$) crossing the separator is adequately suppressed or minimized. The propensity of a given anion species to cross the AEM separator is a function of the ion's mobility in combination with the concentration of the anion (availability) in the basifying solution relative to other anions. Using the above example, the ionic mobility of a hydroxyl anion ($OH^-$) is about 2.6 times greater than that of a chloride ion ($Cl^-$). Therefore, if the concentration of the desired salt anion (e.g., $Cl^-$) in the basifying solution is greater than the desired hydroxyl concentration in the basifying solution by more than the ratio of their ionic mobilities, the desired salt anion (e.g., $Cl^-$) will be more likely to cross the separator than the hydroxyl and the desired salt anion will contribute to more than 50% of the current at any time. In this example, if the concentration of chloride in the basifying solution is more than 2.6 times the concentration of hydroxyl anions ($OH^-$), then it becomes more likely that a chloride anion will cross the AEM than a hydroxyl anion, and chloride will contribute to more than 50% of the current.

In some embodiments, hydroxyl crossover inefficiency in an AEM electrolytic ABG may be mitigated by adding a layer of porous material between the cathode electrode and the AEM separator to increase the diffusion length for hydroxyl anions generated at the cathode. This increased diffusion path will also contain salt cations (e.g., $Na^+$) in the supplied basifying solution. Increasing the diffusion path length between the cathode electrode and the AEM separator decreases the likelihood that hydroxyl anions generated at the cathode will cross the AEM separator. Salt anions, being present in the porous layer at a relatively high concentration compared to hydroxyl, are more likely to cross the AEM. Some examples of such a porous material layer are described in more detail below with reference to FIG. 4.

The above methods will mitigate inefficiency due to crossover of an undesired anion but typically will not directly address inefficiency due to possible cation crossover due to conduction of protons ($H^+$) across the AEM from the anode chamber into the cathode chamber. In some embodiments, this mode of AEM cation leakage inefficiency may be addressed (and AEM anion crossover inefficiency may be further mitigated) by adding an additional porous layer onto the anode side of the AEM separator. In some embodiments, anion crossover inefficiency in an AEM electrolytic ABG may be mitigated by adding a layer of porous material between the anode electrode and the AEM separator to increase the diffusion length for cations generated at the cathode. This increased diffusion path typically will also contain salt anions having crossed the AEM from the anode chamber. Therefore, by increasing the diffusion path length, the protons generated at the anode are less likely to reach and cross the AEM separator.

Figure 4:
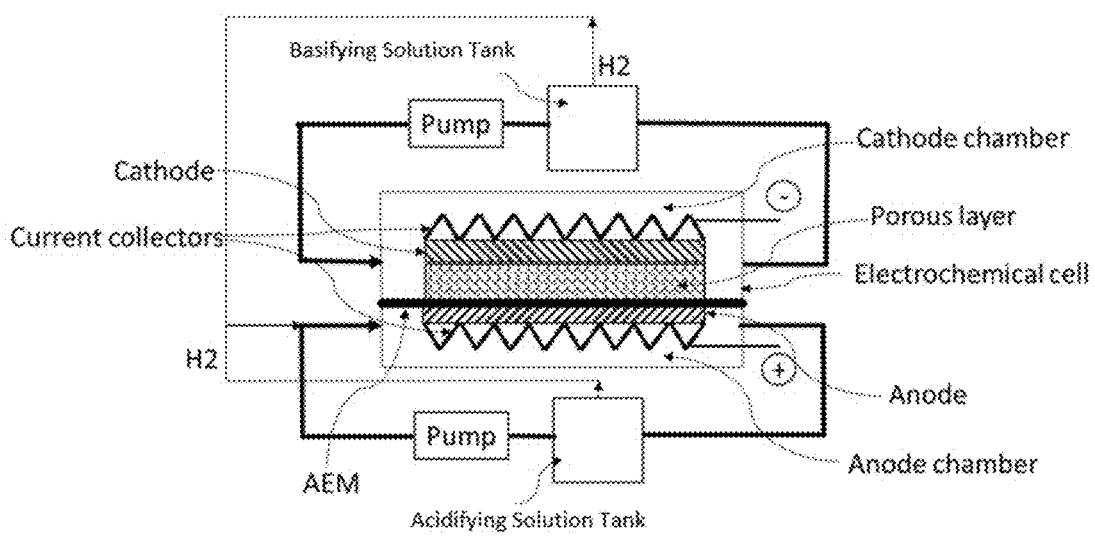
FIG. 4 is a schematic illustration of an acid-base generation cell comprising a separator membrane having an added porous diffusion layer.

As shown in FIG. 4, a layer of porous material may be positioned between an electrode (e.g., the cathode as shown in FIG. 4) and the separator membrane (e.g., an AEM as shown in FIG. 4). The added porous layer represents an extended diffusion path between the electrode and the separator, thereby decreasing the probability that ions produced at the electrode (e.g., $OH^-$ in the example of FIG. 4 or $H^+$ protons as described herein) may reach and cross the separator membrane before the preferred salt ions.

In various embodiments, the porous layer may be a microporous separator material similar to those used in batteries (e.g., porous sheets of polyolefin, polypropylene, other materials, or any combination thereof), a plastic net and/or mesh (e.g., such as woven and/or non-woven web-type sheet with openings), or any combination thereof. In such embodiments, the porous layer may simply be pressed against the separator membrane (PEM or AEM), or may be laminated or adhered by solvent, heat-sealing, adhesives, or otherwise, or any combination thereof. In some embodiments, the porous layer may be a microporous separator supporting a thin PEM or AEM film (e.g., a PEM or AEM film may be cast directly onto the microporous separator material).

As in the PEM case, the anode electrode and/or the entire cell or stack may be oriented at an angle or otherwise configured (such as by additional structures or three-dimensional electrode structures) to enhance hydrogen gas contact with the anode catalytic surface.

Figure 5:
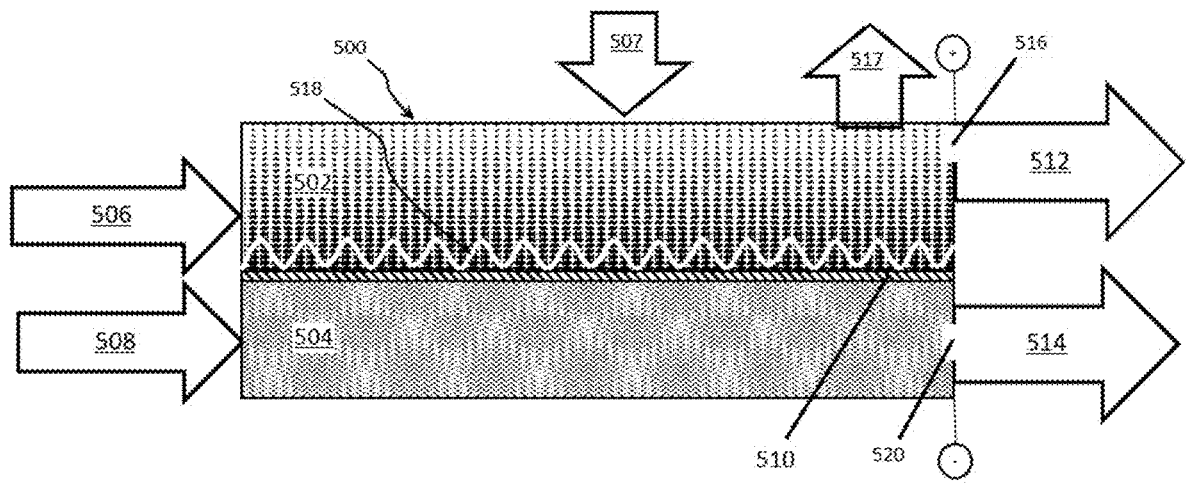
FIG. 5 is a schematic illustration of an acid-base generation cell comprising an anode electrode having a hydrophobicity gradient and a liquid flow-field channel between the anode electrode and the separator membrane.

In various embodiments of a cell with horizontally-oriented (or otherwise non-vertically oriented as described herein) electrodes, the cathode electrode may be positioned above the anode electrode as shown in FIG. 1 and FIG. 4, or the anode electrode may be positioned above the cathode electrode as shown in FIG. 2, FIG. 3 and FIG. 5. Positioning the anode below the cathode may allow for introduction or injection of hydrogen gas at a lower portion of the cell such that buoyant forces will cause gas bubbles to rise up toward the anode/separator interface where the gas may be oxidized. Alternatively, positioning the anode above the cathode (and the separator) may allow for different gas/liquid fluid mechanics as described with reference to FIG. 5.

FIG. 5 illustrates an embodiment of an acid-base generator cell 500, aspects of which may be incorporated into any of the cell or cell-stack configurations described herein. The cell 500 of FIG. 5 may comprise horizontally-oriented electrodes 502 (positive/anode) and 504 (negative/cathode) and separator membrane 510 with an anode electrode 502 positioned above the cathode 504 electrode. The anode electrode 502 of FIG. 5 may be fabricated so as to exhibit a hydrophobicity gradient (represented in FIG. 5 as a gradient of dot sizes with larger dots representing increasing hydrophilicity) with a predominantly hydrophilic (i.e., very low hydrophobicity) face closest to the separator membrane 510 and a predominantly hydrophobic face furthest from the separator membrane 510.

In various embodiments, an anode electrode 502 with a hydrophobicity gradient may be fabricated with a greater quantity of a hydrophobic material, such as particulate or fibrillated PTFE, at the hydrophobic face than at the hydrophilic face. Alternatively, an anode 502 electrode with a hydrophobicity gradient may be made by laminating materials of different hydrophobicity to one another. In various embodiments, such an anode electrode 502 may have a stepwise gradient, a continuous gradient, or other gradient of hydrophobic material from approximately zero at the hydrophilic face to a maximum at the hydrophobic face. In some embodiments, such an anode 502 may comprise one or more hydrophilic additive materials such as metals, metal oxides, or ceramics at or nearer to the hydrophilic face. In some embodiments, an anode may have no hydrophobicity gradient (i.e., the entire anode may have a consistent hydrophobicity or hydrophilicity throughout).

In the cell of FIG. 5, a flow-field layer 518 may also be positioned between the separator 510 and the hydrophilic face of the anode 502. In some embodiments, the flow field 518 may be a separate layer of material positioned between the anode 502 and the separator 510. For example, the flow field layer 518 may be a material such as the porous material layer described herein with reference to FIG. 4, or a different material such as a corrugated perforated sheet, a mesh, a foam, a web, a felt, ribs, vanes, or other substantially electrically non-conductive or electrically conductive material, or any combination thereof, that permits electrolyte flow from a cell inlet to a cell outlet.

In some embodiments, a fluid 506 entering the anode chamber 502 may comprise a gas-liquid mixture of acidifying solution and hydrogen gas. In other embodiments, the fluid 506 entering the anode chamber 502 may comprise only an acidifying solution, and hydrogen gas 507 may be injected into the anode chamber at a different point (such as through a side wall as shown, or through a different point in an end-wall. In either case, as the fluid 506 mixture flows from the anode half-cell inlet to the anode half-cell outlet, the gas will tend to be driven upwards through the hydrophilic-to-hydrophobic anode electrode. The hydrogen will be reduced as gas molecules contact conductive surfaces of the anode 502. Unreacted hydrogen gas will tend to be driven to the upper portion of the half-cell, allowing the predominant flow through the flow field layer to be liquid electrolyte. In some embodiments, gas-liquid mixture (which also now includes an increased concentration of acid) exiting the anode chamber may be removed together through a common anode outlet 516. Alternatively, a separate gas outlet 517 may be provided.

By maintaining substantially only electrolyte in the flow field layer 518, protons will tend to be produced at regions of the anode distant from the separator membrane, and any protons within the flow field layer 518 will tend to be carried out of the anode chamber 502 by the flowing electrolyte, thereby minimizing the opportunity for protons to cross the separator 510. In some embodiments, the acidifying solution may comprise a concentration of metal salt cations which exceeds a ratio of ionic mobility of protons to the ionic mobility of the metal cation through the separator, thereby causing the metal cations to preferentially cross the separator as charge carriers due to their higher concentration relative to protons in the region of the flow field layer 518. In FIG. 5, a basifying solution 508 enters cathode chamber 504 and then exits the cathode chamber 504 via outlet 520 as a mixture 514 of basifying solution, generated $H_2$, and base.

The schematic cells of FIG. 1 through FIG. 5 may each represent an individual stand-alone cell or one cell in a multi-cell stack such as a monopolar or bipolar cell stack. Such stacks may be configured with as many substantially identical cells (or differently configured cells) as needed to achieve desired performance goals (e.g., voltage or current performance targets). While the cells of FIG. 1 through FIG. 5 are shown in a horizontal orientation, in some embodiments such cells may be oriented vertically or at any other angle.

Three-Chamber Systems

As shown in FIG. 6, an electrolytic acid-base generator may also be configured to operate with a three-chamber cell 600 (or a stack or other bundle of such cells). In such embodiments, a middle chamber 602 is separated from an anode chamber 604 by a first separator membrane 610 and from a cathode chamber 606 by a second separator membrane 612. The anode electrode 618 and the cathode electrode 616 may each be in contact with a respective current collector 614, 620. In some embodiments, the anode chamber may contain substantially only hydrogen gas, a first salt solution may be driven to flow through the middle chamber, and a second salt solution (which may comprise the same salt(s) or a different salt than the first salt solution) or water may be driven to flow through the cathode chamber.

In some embodiments, the first separator membrane 610 may be a PEM separator and the second separator membrane 612 may be an AEM separator. In such embodiments, protons produced at the anode by oxidation of hydrogen gas may cross the PEM (first) separator 610 into the middle chamber 602 into which a salt solution may be directed. Concurrently, a salt anion (e.g., $Cl^-$ in the above example) may cross the AEM (second) separator 612 from the cathode chamber 606 into the middle chamber 602. The protons ($H^+$) and salt anions (e.g., $Cl^-$) in the middle chamber 602 may combine to form an acid (e.g., HCl). Concurrently, the hydroxyl anions ($OH^-$) from water reduction and the salt cations (e.g., $Na^+$) in the cathode chamber may combine to form a base.

In some embodiments, the middle chamber 602 may be configured to be as narrow as possible to provide the smallest possible distance between the anode electrode and the cathode electrode. For example, in some embodiments, the middle chamber may be limited to a thickness on the order of about 0.1 mm or less up to about two centimeters. In some embodiments, a middle chamber may have a width of about 0.2 mm to about 10 mm (1 cm). Larger anode-cathode gaps will cause increased ohmic resistance in the cell (particularly in bipolar cell-stacks). Therefore, while gaps greater than 1 or 2 cm are possible, smaller gaps may provide more energy efficient operation. For example, in some embodiments, the middle chamber 602 comprises a (preferably electrically non-conductive) porous flow-through material that may be compressed between the anode-side separator and the cathode-side separator. In various embodiments, a flow-through material in a middle chamber 602 may comprise a mesh, a felt, a corrugated structure, ribs, vanes, or other structures suitable for maintaining a flow channel while minimizing a distance between electrode-separator contact planes, or any combination thereof.

As described above, the hydroxyl anion ($OH^-$) produced at the cathode may compete with the salt anion to cross the AEM separator. Any of the various methods for increasing the probability of the salt anion crossing the AEM instead of the hydroxyl anion described elsewhere herein may be used in a three-chamber system as well.

In other embodiments, both the first separator membrane 610 and the second separator membrane 612 may be PEM separators. In such embodiments, protons produced at the anode by oxidation of hydrogen gas may cross the first PEM separator 610 into the middle chamber 602. The protons ($H^+$) and salt anions (e.g., $Cl^-$) in the middle chamber 602 may combine to form an acid (e.g., HCl) in the middle chamber 602. Concurrently, a salt cation (e.g., $Na^+$ in the above example) may cross the second PEM separator 612 from the middle chamber 602 into the cathode chamber 606. The salt cations (e.g., $Na^+$) in the cathode chamber may combine with hydroxyl ($OH^-$) produced by the reduction of water at the anode to form a base (e.g., NaOH).

Controlling Concentration Ratios

As described above, one method of mitigating inefficiency due to unwanted ionic species crossing a separator membrane is to ensure that the concentration of salt ions (cations or anions) exceeds the concentration of corresponding electrochemically produced ions (protons or hydroxyl anions) by approximately the ratio of their respective ionic mobilities or a greater ratio. If the acidifying solution and basifying solution are recirculated between their respective storage vessels and the electrochemical reactor, the concentration of salt ions typically will decrease during each cycle as they are combined with protons and hydroxyl ions to form acid and base, respectively. Therefore, in some embodiments, when salt ion concentrations fall below a threshold value, additional salt may be dissolved in the electrolyte solution(s) to raise the salt concentration above to a desired level. Alternatively, the acidifying solution and/or basifying solution may be periodically mixed with a fresh or concentrated salt solution in order to maintain a desired ratio of salt ions to electrochemically produced ions. For example, a salt ion concentration in the acidifying solution and/or basifying solution may be continuously monitored or periodically measured, and supplemental salt or a higher-concentration salt solution may be added if the salt ion concentration falls below a predetermined value.

In other embodiments, a rate of production of electrochemically produced ions may be increased or decreased based on a measured salt ion concentration to achieve a desired ratio. For example, if a salt ion concentration is measured (or otherwise known or expected) to be below a threshold value, the ratio of salt ions to electrochemically produced ions may be increased by decreasing a rate of electrochemical ion production, which may be achieved by decreasing the electrical current applied to the reactor cell (s). This current decrease operation may be particularly advantageous toward the end of an acid/base production cycle when hydroxide and proton concentrations are relatively high (e.g., when proton and/or hydroxide concentrations are within 5%, 10%, 20%, 30%, 40% or 50% of a target final acid and/or base concentration). Similarly, if a salt ion concentration is measured (or otherwise known or expected) to be above a threshold value, a rate of electrochemical ion production may be increased by increasing the electrical current applied to the reactor cell(s). This current increase operation may be particularly advantageous toward the beginning of an acid/base production cycle when hydroxide and proton concentrations are relatively low (e.g., when proton and/or hydroxide concentrations are within 5%, 10%, 20%, 30%, 40% or 50% of a starting concentration at the beginning of a cycle with a fresh or recycled salt solution). However, in some embodiments, the ratio of salt ions to electrochemically produced ions may be as high as achievable while sufficient electrochemically produced ions are being produced.

In still other embodiments, a concentration of salt ions in the electrolytes (acidifying solution and basifying solution) may be adjusted to be sufficient to exceed a desired ratio of salt ions to produced ions for enough recirculation cycles to achieve desired acid and/or base concentrations. For example, if a desired acid and/or base concentration may be achieved in ten recirculation cycles (circulation of electrolytes between storage vessels and reactor), then a starting concentration of salt may be established to be at least ten times a minimum desired ratio.

In other embodiments, an effective concentration of electrochemically produced ions within the cell(s) may be changed by increasing or decreasing a flow rate of electrolyte through a half-cell chamber (i.e., an anode chamber or a cathode chamber). Flowing electrolyte at an increased rate will tend to sweep and dilute the electrochemically produced ions from the half-cell in which they were produced, thereby decreasing an effective concentration of electrochemically produced ions in the half-cell.

In some embodiments, any of these methods or systems for maintaining a desired ratio of salt ions to electrochemically produced ions may be used alone or in combination with one another in any of the various electrochemical acid-base generation system or method embodiments described herein.

Controlling Relative Quantities of Acid and Base Products

In some embodiments, it may be desirable to produce an acidified solution with a different acid concentration than a base concentration of a basified solution (i.e., producing the same absolute quantity of $H^+$ and $OH^-$ but with different effective concentrations in their respective solutions). Such an objective may be achieved by using a larger starting volume of electrolyte for the solution that is to have a lower acid or base concentration, while flowing the electrolytes at substantially equal flow rates for both sides or at higher flow rate for the low concentration but higher volume side.

Materials, Components, and Conditions

The electrodes for the present invention may be any electrode known to be suitable in industries such as water electrolysis, hydrogen oxidation, chlor-alkali production, or other similar electrochemical or specifically electrolytic processes. In particular, the cathode of the present system may be a cathode typically used in alkaline water electrolyzers, such as electrodes comprising nickel, a nickel alloy, a precious metal, or any combination thereof. Suitable precious metals may include platinum, palladium, ruthenium, rhodium, or any combination thereof.

In some embodiments, electrodes may comprise catalysts applied to a support structure such as a separator membrane, porous layer, current collector, high surface-area carbon, or other structure, or any combination thereof. In some embodiments, an electrode may comprise porous structures such as carbon cloth, carbon felt, carbon paper, porous metallic structures such as nickel or other metal foam, or any combination thereof. In some embodiments, an electrode may comprise one or more metal catalysts dispersed on a surface of a porous support. In some embodiments, an electrode may comprise an independent layer that may be pressed against a separator membrane or against a porous layer as described herein. In various embodiments, electrodes may be in contact with or integrated with a current collector.

In some embodiments, an anode as described herein may comprise any catalyst or electrode typically used in hydrogen fuel cells. Such an anode may include precious metal catalysts that may or may not be supported on high surface area carbon. In some embodiments, an anode electrode may additionally comprise polytetrafluoroethylene (PTFE) and/or other highly hydrophobic polymer so as to encourage gas diffusion to the anode catalytic surface.

In some embodiments, an anode electrode may comprise a three-dimensional structure partially or entirely filling the volume between the separator membrane and the current collector or bipolar plate. An example of such a three-dimensional structure electrode may be a flow through electrode such as a felt type electrode typically encountered in flow batteries. The three-dimensional structure may encourage good interaction of the electrode with gas flowing through the anode chamber. In some embodiments, a catalyst may be coated onto a three-dimensional structure electrode.

In some embodiments, current collectors may be structures separate from the electrodes and pressed against or welded to an electrode structure. In other embodiments, current collectors may comprise bipolar plates, flow-field plates, or other structures, or any combination thereof. In still other embodiments, electrodes and current collectors may be integrated structures in which a catalyst is applied to one surface of a three-dimensional conductive support such as a felt, foam, mesh, sheet, plate, or any combination thereof. Current collectors may be made of any conductive metal and/or non-metal material that will withstand the chemical environment in which it will operate as described herein.

In some embodiments, an anion exchange membrane (AEM) may comprise a freestanding sheet or membrane of any known anion exchange polymer(s) such as those manufactured by companies such as Fumatech, W7energy, Xergy (e.g., DURION® resins or membranes), or any combination of such polymers. In other embodiments, an anion exchange membrane may be cast onto and supported by another structure such as a porous layer, or other structure.

In some embodiments, a cation exchange membrane (also referred to herein as a "proton exchange membrane" or PEM) may comprise a freestanding sheet or membrane of any known cation exchange polymer(s) such as resins or membranes sold under the trademark Nafion® or those produced by companies such as Asahi Kasei or others, or any combination of such polymers. In some embodiments, a cation-selective membrane may be chosen based on selectivity for a particular metal cation. For example, a ceramic-based membrane may be configured to predominantly conduct sodium ($Na^+$) cations. An example of such a class of materials is known as NASICON (Na super ionic conductor), typically comprising a material of the formula $Na_{1+x}Zr_2Si_xP_{3-x}O_{12}$, $0<x<3$. Any NASICON material may be used as appropriate in combination with the embodiments herein. In other embodiments, a cation exchange membrane may be cast onto and supported by another structure such as a porous layer, or other structure.

In various embodiments, other system components may comprise any suitable pumps, piping conduits, tanks, or other structures, or any combination thereof, as suggested by the description herein and generally known to those skilled in the art.

In various embodiments, cells such as those described herein may be deployed as individual "monopolar" cells which may be electrically and/or fluidically connected to one another in any series and/or parallel combination. In other embodiments, multiple cells may be combined in a common structure in a bipolar stack with adjacent cells sharing a conductive bipolar plate.

Seawater Carbon Extraction Using Acid Base Generation System

In some embodiments acid and base produced by an electrochemical acid-base generator may be uniquely suited to performing a process for extracting carbon dioxide from ocean water. The propensity of a dissolved gas to be removed from a solute at a given partial pressure above the liquid is referred to as its Henry volatility, which, in the case of $CO_2$, may be dependent on the pH of the solution. Therefore, if the pH of a portion of oceanwater containing dissolved $CO_2$ is decreased from its typical value (in 2021) of about 8.1 to a pH of about 4, the $CO_2$ may be removed by applying a negative pressure to the water. In some embodiments, the pH may be lowered to other values prior to or during $CO_2$ removal via negative pressure, such as pH values of 5, 4.5, 4, 3.5, 3, 2.5, 2, 1.5, 1, 0.5, or 0, or any range made therefrom, such as 0-5, 0-4, 0-3.5, 0.5-5, 0.5-3.5, 1-5, 1-4.5, 1-3, 2-5, 3-5, 1.5-2.5, 0.5-1.5, 1.5-2.5, 2.5-3.5, or 3-4.

Therefore, one method of using the acid and base generated by the electrochemical acid base generators described herein may comprise: (1) mixing a volume of ocean water containing dissolved $CO_2$ with a volume of acid sufficient to decrease the pH of the mixture to about 4 (e.g., between about 3 and about 5) to thereby convert bicarbonate $HCO_3^-$ in the seawater to carbonic acid $H_2CO_3$ (2) applying a negative pressure to the mixture to remove the dissolved $CO_2$, (3) capturing the removed $CO_2$ for subsequent use (e.g., by sequestering the $CO_2$, or by using the captured $CO_2$ to make syngas and/or a synthetic liquid fuel), and (4) adding a volume of base solution to the mixture sufficient to raise the pH to about 8.0, and returning the mixture to a body of water, such as the ocean, as described elsewhere herein.

In another embodiment, one method of using the acid and base generated by the electrochemical acid base generators described herein may comprise: (1) mixing a volume of ocean water containing dissolved inorganic carbon species with a volume of base sufficient to increase the pH of the mixture to about 12 (e.g., between about 10 and about 13) to thereby convert bicarbonate $HCO_3^-$ in the seawater to solid calcium carbonate precipitate $CaCO_3$, (2) separating the solid precipitate from the seawater solution by any suitable solid-liquid separation technique, (3) adding a volume of acid solution to the mixture sufficient to decrease the pH to about 8.0, and returning the mixture to the ocean or other seawater body.

Production of Cement Using Acid Base Generation System

In some embodiments, acid and base produced by an electrochemical acid-base generator may be used to produce building materials such as calcium-containing materials useful in cement and related products, such as concrete, mortar, bricks, cinder blocks, paver stones, solid surface materials and so forth. For example, in some embodiments, acid produced by an electrochemical ABG may be used to dissolve at least a portion of a calcium-containing ore, mineral, and/or other calcium-containing material such as calcite, aragonite, vaterite, limestone, chalk, marble, travertine, eggshells, oyster shells, limescale, agricultural lime, calcium carbonate (e.g., calcium carbonate extracted from seawater as described herein) or others, or any combination thereof. In some cases, carbon dioxide gas may be released through the process of such acid-dissolution of calcium-containing materials (e.g., those containing calcium carbonate). In such cases, the released carbon dioxide may be captured and used immediately (e.g., sequestration, syngas, synthetic liquid fuels, etc.), or stored for subsequent such use.

In some embodiments, the aqueous solution containing the dissolved calcium may be subsequently mixed with a suitable quantity of a base (e.g., a base produced by an electrochemical ABG). The calcium cations will react with the hydroxyl anions from the base to form calcium hydroxide ($Ca(OH)_2$), which will tend to precipitate out of the solution. The precipitated solid calcium hydroxide may then be removed from the solution, optionally rinsed, dried, and retained for use in making building materials. The remaining salt solution may then be re-circulated into the electrochemical acid-base generator (either directly or via a salt storage tank) in order to produce new acid and base solutions, and optionally repeating the dissolution-precipitation process. If the salt ions (e.g., $Na^+$ and $Cl^-$) are not consumed during the dissolution-precipitation process, the process may be cyclically repeated using the same salt as many times as desired, while adding only water as needed to replace removed hydroxide.

In embodiments of any of the systems and methods herein, precipitated (or other) solids may be removed from a liquid solution by any suitable solid-liquid separation technique or apparatus, including filtration, gravity settling, hydrocyclones, flocculation, high shear or low shear crossflow separation, or any combination of these or others.

Calcium hydroxide precipitated as described herein may be combined with silicate materials (e.g., sand and/or clay) and reacted at high temperatures (e.g., between about 1,000° C. and about 2,000° C.) to form tricalcium silicate (e.g., $Ca_3SiO_5$ or $3CaO*SiO_2$). For example, calcium hydroxide and a silicate material may be combined and mixed in a kiln or oven at a temperature of about 1,500° C.+/−200° C. In some embodiments, calcium hydroxide may be heated alone to produce calcium oxide prior to, or during these or other processing steps. In various embodiments, any water vapor produced by dehydration of calcium hydroxide may be captured for reuse in this process or other processes.

In another example embodiment, calcium hydroxide precipitated as described herein and carbon dioxide captured in a process such as the calcium carbonate dissolution process described herein (or from other carbon-capture processes) may be used in the process described in U.S. Pat. No. 10,968,142 to Sant et. al. to form carbon-neutral cement (additional details of this process and background may be found in the paper published by the inventors of the U.S. Pat. No. 10,968,142 patent: "Direct Carbonation of $Ca(OH)_2$ Using Liquid and Supercritical $CO_2$: Implications for Carbon-Neutral Cementation", Ind. Eng. Chem. Res. 2015, 54, 8908-8918, by Vance et. al.).

In various embodiments, precipitated calcium hydroxide may be de-hydrated to calcium oxide (CaO), such as by heat distillation, membrane distillation, through the use of desiccants, or other techniques or combinations of techniques. The calcium oxide may be stored and/or transported prior to use in forming building materials without $CO_2$. In some embodiments, depending on the material(s) dissolved in the acid as described above, other building materials may also be precipitated or otherwise separated from the solution and used for subsequent processes. Similarly, if calcium carbonate or other materials are extracted from seawater as described herein, additional materials may also precipitate and be collected for use in subsequent processes, for example, other metal hydroxides or carbonates may be obtained.

Efficient Acid Base Generation Systems Using Weak Acids

In some embodiments, production of acid and base by an electrolytic acid-base generator may be further improved by producing a weak acid rather than a strong acid. Weak acids are defined as those acids that do not fully ionize when dissolved in water. Because weak acids more tightly bond protons (i.e., they are "weak" in that they are less prone to giving up protons), those protons bound in the weak acid are less likely to migrate across any separator membrane into a chamber containing hydroxyl ions and causing inefficiency by recombining to form water.

In various embodiments, any of the acid base generator cell configurations described herein may be used to produce weak acids by selecting a salt prone to weak-acid production once split into component parts. Examples of common salts leading to weak acids include $Na_2CO_3$ or $NaHCO_3$ (e.g., to make carbonic acid), $NaH_2PO_4$ (e.g., to make phosphoric acid), $CH_3CO_2Na$ (e.g., to make acetic acid), salt of oxalic acid ($C_2H_2O_4$), salt of citric acid ($C_6H_8O_7$), salt of maleic acid ($C_4H_4O_4$), and salt of boric acid ($H_3BO_3$). In some embodiments, sodium bisulfate ($NaHSO_4$) may be used to make sulfuric acid which beneficially tends to bond protons more tightly than other strong acids. Other salts yielding weak-acids when split, including some organic salts, may be used in an acid base generator to produce a weak acid rather than a strong acid to thereby improve the coulombic efficiency of the acid-base generator. In some embodiments, any combination of salts can be employed, including combinations of salts in this paragraph or combinations of one or more salts of this paragraph with any other salt or salts disclosed elsewhere herein.

In some embodiments, an acid-base generator configured to produce carbonic acid may be integrated with a system for capturing $CO_2$ from air and/or another gas mixture (e.g., flue gases, combustion gases, and/or any other stream containing $CO_2$, including gaseous waste streams). An example of such a system is shown in FIG. 7.

FIG. 7 illustrates a three-chamber ABG cell in which a sodium carbonate salt is converted to carbonic acid in the (center) acid-concentrating chamber of the cell. The acid solution exiting the acid-concentrating chamber may be subjected to a gas-liquid separation technique in order to extract and collect carbon dioxide gas from the carbonic acid. The collected carbon dioxide may be sequestered, stored, or used in another process to make synthetic fuels or materials as described elsewhere herein. Alternatively, a portion (e.g., 5%, 10%, 25%, 50%, 75%, 90% or more) or all of the carbonic acid may be stored in a tank and/or used for another purpose (e.g., for dissolving a mineral material as described herein with reference to FIG. 13).

Water remaining after removing $CO_2$ may be returned to the base-concentrating chamber of the ABG cell. A base solution withdrawn from the base-concentrating chamber may be directed to a liquid-gas separator to remove produced hydrogen which may then be directed to the hydrogen-depolarized anode chamber as described elsewhere herein. The remaining base solution may then be directed to a liquid-gas contactor (e.g., an air-contactor, a point-source flue gas contactor or other contactor increasing contact between a $CO_2$-containing gas and the base liquid) in which carbon dioxide gas is dissolved in the base solution, forming a carbonate (or bicarbonate). The carbonated base solution (e.g., $Na_2CO_3$ in the illustrated example) may then be returned to the acid-concentrating chamber for another carbon capture and collection cycle.

While the example of FIG. 7 is shown and described with reference to a sodium carbonate material, any other cation that will form a base and a carbonate as described may be used in such systems and methods. Additionally, salts other than or in addition to a metal carbonate may be used in such systems, including any of the salts described elsewhere herein.

Figure 8:
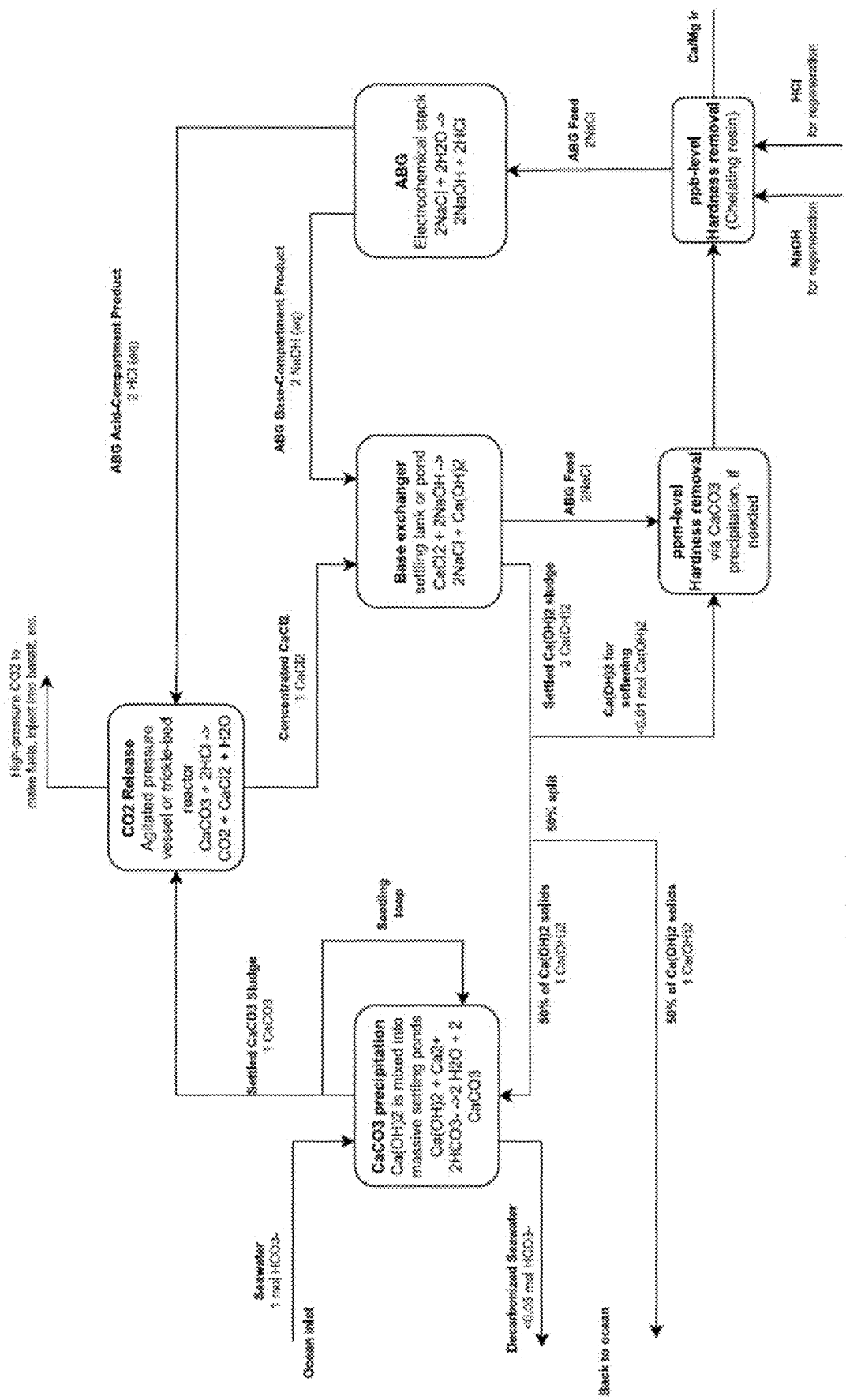
FIG. 8 is a schematic diagram illustrating an example system for capturing carbon dioxide from seawater by converting calcium hydroxide to calcium carbonate, extracting pure $CO_2$ from the calcium carbonate by dissolving the calcium carbonate with a carboxylic acid (e.g., acetic acid), and an electrolytic acid-base generator configured to regenerate carboxylic acid and a base (e.g., NaOH) for converting calcium chloride to calcium hydroxide.

FIG. 8 illustrates an example system incorporating an acid base generator configured to produce acetic acid (a weak acid) and to capture $CO_2$ from seawater through the use of a regenerable calcium hydroxide. The system of FIG. 8 illustrates converting calcium hydroxide to calcium carbonate (e.g., by combining calcium hydroxide with seawater which contains bicarbonate ions), extracting pure $CO_2$ from the calcium carbonate by dissolving the calcium carbonate with a carboxylic acid (e.g., acetic acid), and an electrolytic acid-base generator configured to regenerate the carboxylic acid and a base (e.g., NaOH) for converting calcium chloride to calcium hydroxide.

Figure 9:
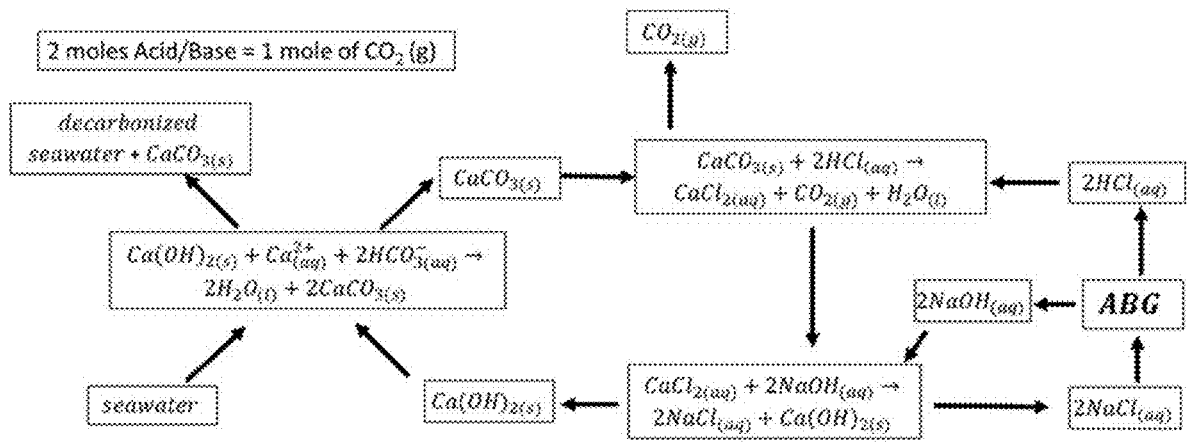
FIG. 9 is a schematic diagram illustrating a system for extracting $CO_2$ (bicarbonate) from seawater by adding calcium hydroxide to seawater, extracting pure $CO_2$ by dissolving the calcium carbonate with hydrochloric acid, and regenerating HCl and NaOH with an acid base generator.

FIG. 9 illustrates an example of an alternative system and method for extracting $CO_2$ in the form of bicarbonate from seawater through the use of a regenerated calcium hydroxide intermediate. As shown, an electrochemical ABG (e.g., electrolytic or electrodialytic) may be used to produce an acid (e.g., HCl in the illustrated example) and a base (e.g., NaOH in the illustrated example). The base is mixed with an aqueous calcium chloride ($CaCl_2$)) solution to precipitate calcium hydroxide ($Ca(OH)_2$). The calcium hydroxide is added to seawater (containing calcium cations and $HCO_3^-$ bicarbonate anions) in a reactor configured to facilitate the conversion of calcium hydroxide and bicarbonate to solid calcium carbonate ($CaCO_3$) by precipitation. The solid calcium carbonate may then be removed from the reactor and dissolved with acid from the electrolytic ABG, thereby releasing $CO_2$ gas, which may be captured and stored for sequestration or used for producing synthetic fuels and/or other hydrocarbon materials. Aqueous calcium chloride (or other aqueous calcium compound) may be mixed with the base from the electrolytic ABG to begin a new cycle.

Figure 10:
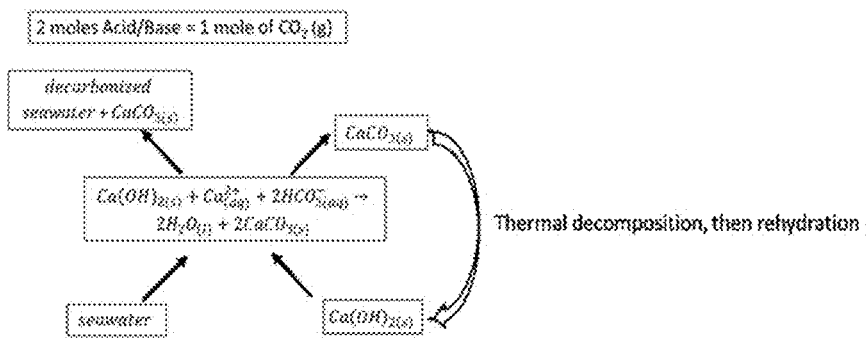
FIG. 10 is a schematic diagram illustrating a system for extracting $CO_2$ (bicarbonate) from seawater by adding calcium hydroxide to seawater, thereby forming calcium carbonate, extracting pure $CO_2$ while calcining the calcium carbonate, and re-hydrating the calcium oxide resulting from calcining to regenerate calcium hydroxide for a subsequent cycle.

FIG. 10 illustrates an alternative method for extracting $CO_2$ from seawater. In the method of FIG. 10, calcium hydroxide is mixed with seawater to produce calcium carbonate as in the process described with reference to FIG. 9. The calcium carbonate may then be thermally decomposed (calcined) by heating to a temperature of about 800° C. to 1200° C. until it is substantially converted to calcium oxide. Thermal decomposition of calcium carbonate will release $CO_2$ gas, which may be captured and stored (e.g., sequestered), used to make synthetic fuels, and/or other hydrocarbon materials. The calcium oxide may then be rehydrated (e.g., by mixing with tap water, deionized water, seawater, etc.) to form calcium hydroxide, which may then be reacted with seawater to form new calcium carbonate.

In some embodiments of each of the methods described herein with reference to FIG. 8, FIG. 9, and FIG. 10, if desired only a portion of the calcium carbonate produced by mixing calcium hydroxide with seawater may be recirculated for subsequent $CO_2$ extraction. In each method, a portion of the calcium carbonate may be reserved and returned to the seawater. This is desirable to maintain the seawater's pH and material balance.

Efficient Acid-Base Generation Using an Acid-Capture System

In some embodiments, an electrolytic acid-base generator may be configured for splitting a salt into corresponding acid and base at a high efficiency and producing high-concentrations of both acid and base by utilizing an acid capture system.

Figure 11:
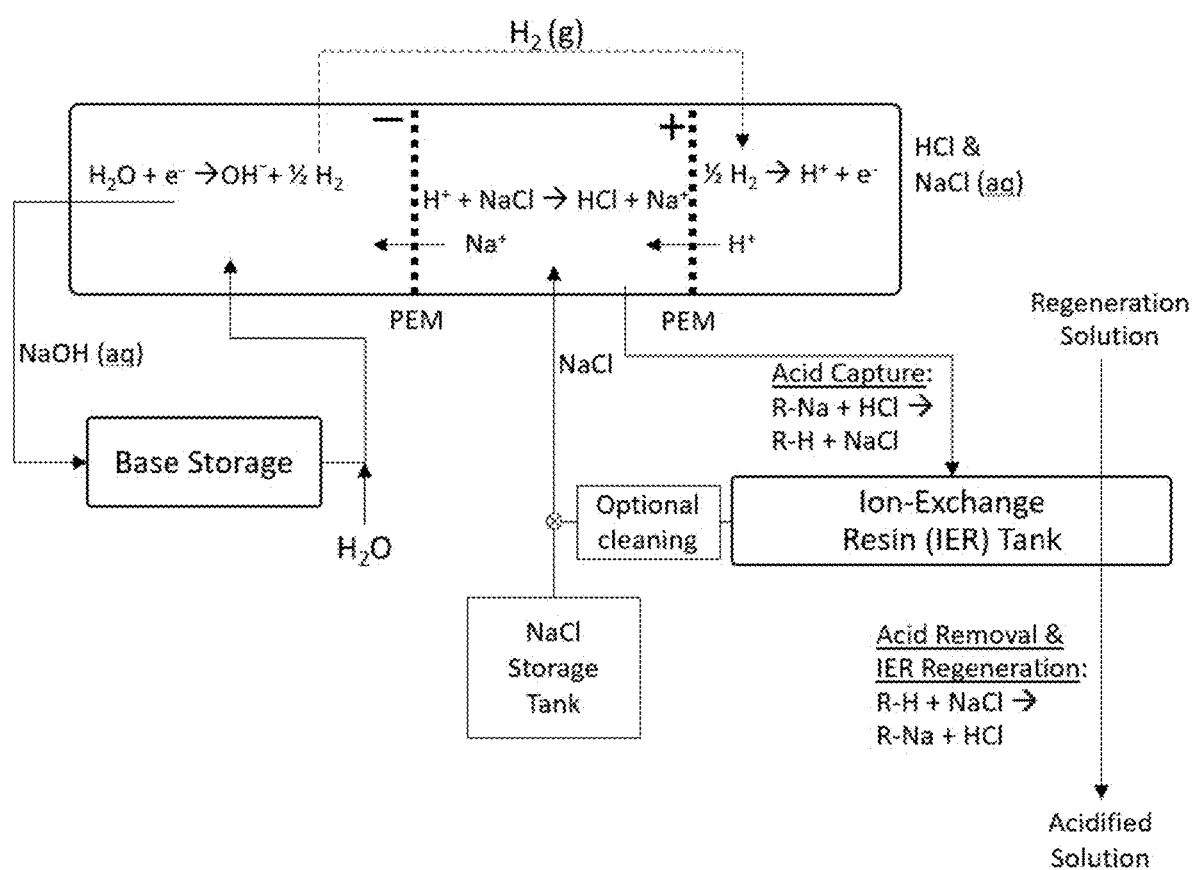
FIG. 11 is a schematic diagram illustrating an electrolytic acid-base generator coupled with an acid-capture system containing an ion-exchange resin configured to store acid produced by the electrolytic acid-base generator outside of the acid chamber, thereby improving efficiency by substantially decreasing the concentration of protons in the acid chamber.

As described herein, one challenge with electrolytic acid-base generation systems is that efficiency is greatly limited by the mobility of protons vs. metal cations (e.g., $Na^+$ cations in one example). In order to produce the base in the left chamber in the cell of FIG. 11, it is preferred for the metal cation (e.g., $Na^+$) to cross the cathode separator preferentially over protons (i.e., to minimize proton crossover from right-to-left through the left PEM separator in the illustrated example). Unfortunately, the mobility of protons across a PEM separator is many times greater than the mobility of sodium or other metal cations. Any protons that cross the PEM separator adjacent to the negative cathode electrode likely will react with hydroxide to produce water, thereby reversing the water splitting reaction. While FIG. 11 illustrates a three-chamber electrolytic cell (as described elsewhere herein), the systems and methods described with reference to FIG. 11 and FIG. 12 may be used with any electrolytic cell configuration, including 2-chamber PEM and AEM cells. In some embodiments, some aspects of the systems and methods of FIG. 12 may be used in combination with an electrodialytic ABG.

However, mobility of metal cations vs protons is also affected by the relative concentrations of those ions. Therefore, if the concentration of metal cations in the center chamber of FIG. 11 is substantially greater than the concentration of protons, then the relative ion mobility becomes less of a factor in determining which cation will cross into the base chamber (the left chamber in FIG. 11).

With reference to the system of FIG. 11, a substantially greater concentration of metal cations than protons in the center chamber may be maintained by continuously removing protons from the center-chamber solution as they are produced at the anode, but before they can cross into the cathode chamber. This may be achieved by circulating the center-chamber solution from the cell to an Ion Exchange Resin (IER) Tank which contains a cation exchange resin. Cation exchange resins exist in strong acid forms and weak acid forms. Either strong acid or weak acid cation exchange resins, or a combination thereof, may be used in various embodiments. Generally, the cation exchange resin is initially charged with a metal cation. This is preferably the same metal cation as in the salt to be split, $Na^+$ in the example here. The ion exchange resin will give up its metal cations in exchange for the protons in the solution, thereby capturing the acid in the resin and replacing the protons in the solution with salt from the resin. The solution exiting the IER tank and returning to the center chamber will then have a greater concentration of metal cations (salt) than it did when exiting the center chamber.

Once enough cycles have been performed (e.g., as measured by pH of the base solution), the acid may be removed from the ion exchange resin tank while simultaneously regenerating the ion exchange resin. This is achieved by first draining all remaining liquid out of the ion exchange resin tank into a temporary salt storage tank. This will leave the resin containing protons in the tank. A fresh salt solution (e.g., seawater, concentrated desalination brine, and/or a pure salt solution made by dissolving pure salt in deionized water) is then directed through the IER tank. In the process, the metal cations of the salt solution will be exchanged for protons in the resin, thereby charging the resin and acidifying the solution passing through the IER tank (i.e., regenerating the resin and extracting the acid). This process enables the production of a high concentration acid solution with a greater efficiency than some other processes by minimizing the concentration of protons in the acid-concentrating chamber.

In the case of brine or seawater as a regeneration solution, the solution exiting the IER tank will be an acidified solution of brine or seawater. This pH shift can be used to convert dissolved bicarbonate to carbonic acid, from which $CO_2$ can be extracted by any suitable gas-liquid separation technique as described herein, such as application of vacuum according to Henry's law.

In the case of pure saline (i.e., pure salt solution) as a regeneration solution, a substantially pure stream of acid may be recovered from the ion exchange resin. The acid may then be used in other processes in combination with the stored base solution.

Some cation exchange resins have a strong affinity for divalent cations and may tend to capture the divalent cations preferentially over protons or the desired cation (e.g., $Na^+$ in his example), making regeneration of the ion exchange resin more challenging. Therefore if substantial quantities of divalent cations (e.g., $Ca^{2+}$ $Mg^{2+}$, $Mn^{2+}$, $Fe^{2+}$, etc.) are present in the regeneration solution, then in some embodiments the regeneration solution may be processed (e.g., by filtration, precipitation, solvent extraction, ion exchange resin extraction, or other processes or combinations of these or other processes) in order to substantially remove the divalent cations prior to the regeneration procedure.

Figure 12:
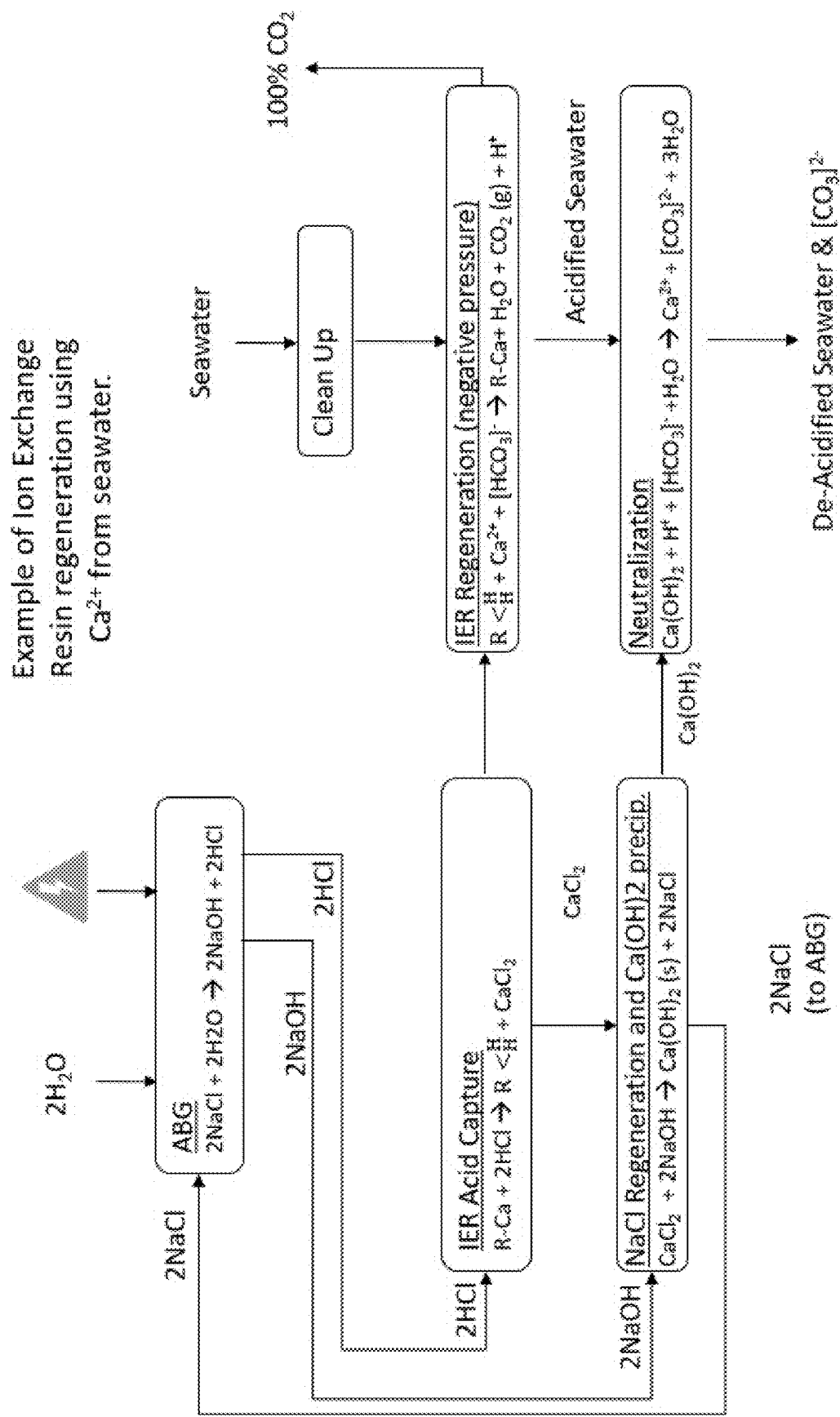
FIG. 12 is a schematic diagram illustrating an alternative method of regenerating the acid-capturing ion exchange resin in a system similar to that shown in FIG. 11.

FIG. 12 illustrates an alternative resin regeneration and acid extraction process in which a divalent cation (e.g., $Ca^{2+}$ in the illustrated example) is used as a mediator in the process of regenerating the acid-capturing capacity of the ion exchange resin and allowing for de-acidification of seawater in a $CO_2$ extraction process.

Electrochemically Accelerated Weathering of Minerals and Material Recovery

In some embodiments, an electrochemical acid-base generator may be used in a process for synthetically weathering minerals containing commercially valuable elements as well as elements useful for carbon-sequestration. In some embodiments, electrolytic acid-base generation systems may be more well-suited to this application due to their ability to operate at higher current densities. Nonetheless, other electrochemical acid-base generators may also be used, including electrodialytic acid base generators, or other electrolytic acid-base generators not specified here.

In some embodiments, magnesium hydroxide and/or calcium hydroxide may be combined with $CO_2$ to form solid or aqueous bicarbonates or carbonates which may be used for sequestering $CO_2$ for long periods of time. Minerals containing these or other carbon-sequestering elements (e.g., Mg or Ca) in addition to commercially-valuable elements exist in earth-abundant quantities but also tend to contain commercially impractical combinations of elements. If the components of such minerals may be economically separated, the valuable product materials may be sold while also creating materials capable of large-scale and long-term $CO_2$ sequestration.

Examples of suitable materials may generally include mafic minerals, which are generally rich in iron and magnesium. However, any other minerals containing commercially valuable elements in addition to at least some quantity of calcium or magnesium (even in small quantities, e.g., less than 10%) may be used in the process described with reference to FIG. 13. For example, earth-abundant mafic minerals and rocks may be used. Some specific but non-exclusive examples of suitable rocks and minerals include olivine (e.g., $Mg_2SiO_4$ and $Fe_2SiO_4$), pyroxene, amphibole, serpentine (e.g., $((Mg,Fe)_3Si_2O_5(OH)_4)$, wollastonite (e.g., $CaSiO_3$), peridotite, talc (e.g., $Mg_3Si_4O_{10}(OH)_2$), biotite (e.g., $K(Mg,Fe)_3AlSi_3O_{10}(F,OH)_2$), basalt, hematite $(Fe_2O_3)$, magnetite $(Fe_3O_4)$, goethite (Fe(OH)O) diabase, gabbro, limestone $(CaCO_3)$, dolomite (e.g., $CaMg(CO_3)_2$), or any combination of these or others. While some examples are described herein with reference to olivine, any other suitable material or combinations of materials may be used in place of or in addition to olivine.

While example chemical compositions are indicated for some of the minerals above, they are not intended to be exhaustive or limiting, because the minerals may contain different crystal forms or other compositions, and rocks containing such minerals may contain other materials. Note that minerals containing carbonates $(XCO_3)$ will tend to release carbon dioxide gas when dissolved in an acid. In such cases, the released $CO_2$ may be captured and either sequestered or used in the manufacture of synthetic fuels or other materials.

In some embodiments, references to dissolving "minerals" may also include dissolution of non-mineral sources of elements capable of forming carbonates with atmospheric or oceanic carbon dioxide may also be used in the process described below. For example, various metal silicate slags or other waste materials from mining or metallurgical processes may contain silicates of iron, magnesium, calcium, etc., and may be used in such a process.

Figure 13:
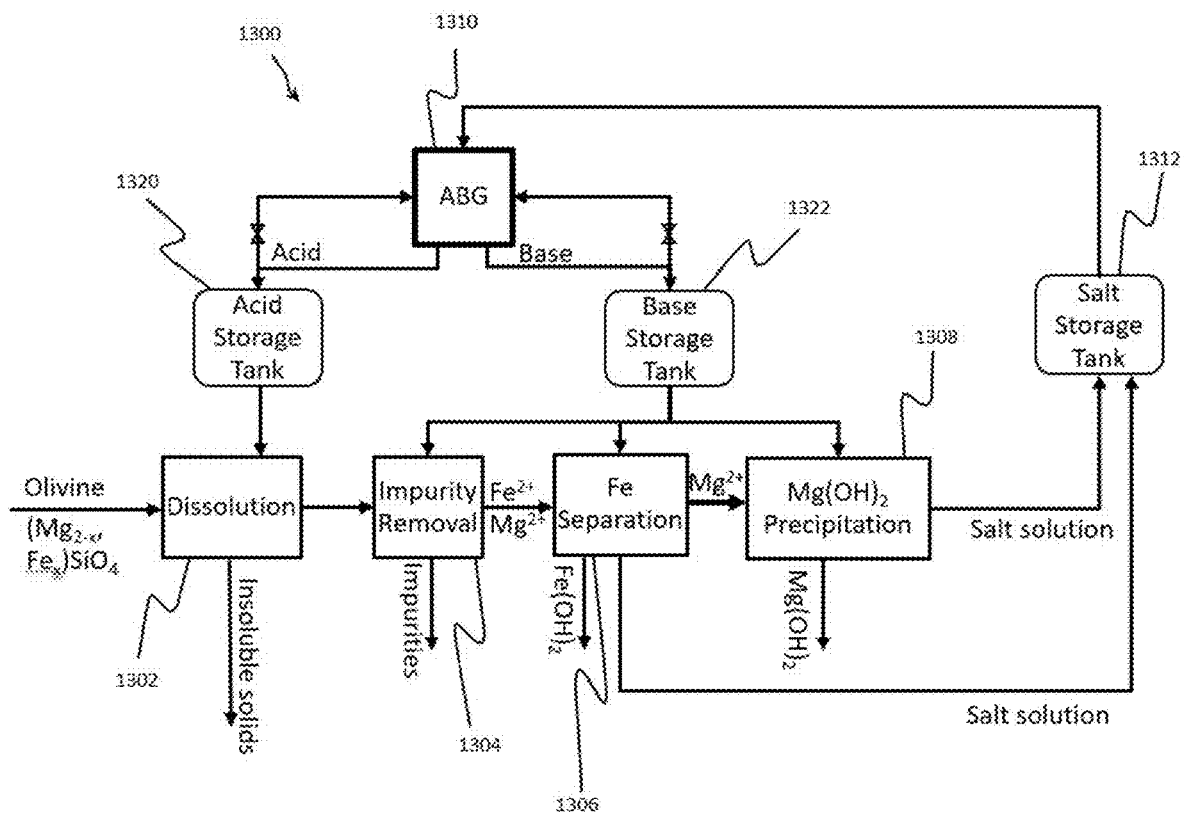
FIG. 13 is a schematic diagram illustrating a system for extracting commercially valuable materials and carbon-sequestering materials from earth-abundant minerals using an acid-base generator.

FIG. 13 illustrates one example of a process 1300 for using acid and base from an electrochemical acid-base generator to extract carbon-sequestering materials and other valuable materials from earth-abundant minerals. In various embodiments, any of the electrochemical acid-base generation systems (or any combination of acid-base generator features) may be used to split a salt (e.g., NaCl in the example illustrated in FIG. 13, but any salt or salts may be used as described herein) into corresponding acid and base streams for use and regeneration as shown and described with reference to FIG. 13. For example, any of the electrolytic acid base generation systems described with reference to any of FIG. 1, FIG. 2, FIG. 3, FIG. 4, FIG. 5, or FIG. 6 may be used for the electrochemically accelerated weathering process described here. Alternatively, the acid and base used in the accelerated weathering process may be produced using an electrodialytic cell (also known as a bipolar membrane cell), an example of which is described below.

The system of FIG. 13 may be made highly compatible with intermittent renewable energy sources by including acid and base storage tanks which may allow for decoupling production of acid and base from their use. This can allow for time-shifting (in hours, days, months, seasons, or even years) and/or geographically-shifting emission-free acid base production from use in processes such as that described with reference to FIG. 13. Similar benefits may be achieved in many of the other systems and methods described elsewhere herein.

While the acid-base generator 1310 is operating, acid and base may be recirculated between the respective storage tank 1320, 1322 and the respective chamber(s) of the ABG 1310 until a desired concentration of acid and/or base is achieved, at which point the return loop may be shut, and acid and base may be drained from the ABG 1310 which may be replenished by a recycled (or fresh) salt solution from the salt-storage tank 1312.

As shown in FIG. 13, The ABG 1310 (i.e., an electrolytic or electrodialytic acid-base generator) produces an acid and a base that may be stored in an acid storage tank (1320) and a base storage tank (1322) respectively. The mineral material (e.g., olivine in the illustrated example or any other material as described herein) may be dissolved at block 1302 using the acid from the acid storage tank 1320 and produced by the ABG 1310. The dissolution may take place in typical dissolution reactors including tanks, vats, etc. The dissolution may be done at a temperature ranging between room temperature to 100° C. Higher temperature may be used to increase the dissolution kinetics. A heat source may be provided to heat and maintain solution temperature at a desired set point. If olivine is the mineral being dissolved, the dissolution mostly produces ferrous ion ($Fe^{2+}$), magnesium ion ($Mg^{2+}$) together with some other dissolved compounds.

Materials and compounds insoluble in acid (e.g., quartz and/or other insoluble compounds) may be removed as solids by filtration or sedimentation or any other method for separating insoluble solids from a liquid. Additionally, when present, some silica may enter solution as a colloidal dispersion that passes through solid/liquid separation. Such colloidal silica may be removed by any suitable method including flocculation and filtration or sedimentation and/or other separation techniques.

The separated solution from bloc 1302 may be sent to bloc 1304 where more impurities are removed as needed. In some embodiments, impurities may be removed in bloc 1304 by precipitation by increasing the solution pH via addition of a portion of the base from the base storage tank. By controlling base addition (i.e., controlling the rate and/or quantity of base added at a particular time to achieve a particular precipitation during a particular step), temperature, and other factors, certain impurities are removed from the solution as solid precipitates. For example, as a base is progressively added to the solution, aluminum hydroxide and chromium hydroxide may precipitate out of solution at a pH around 3 to 5. In this step, colloidal silica may also be removed when other materials precipitate out of solution due to a flocculation effect. In various embodiments, any number of liquid-liquid, solid-liquid, or gas-liquid separation techniques may be used to remove impurities, including solvent extraction, settling, filtration, centrifugal separation, or other techniques or devices, or any combination thereof. In various embodiments, such separation techniques may be used in addition to or in combination with a pH-shift driven precipitation for removal of impurities.

At block 1306, a product material (iron (II) hydroxide or $Fe(OH)_2$ in the illustrated example) may be separated out of the solution by further raising the solution pH above the pH of the impurity removal step. In some embodiments, pH may be raised by controlling addition of a portion of the base from the base storage tank 1320. Specifically, $Fe(OH)_2$ solid may be precipitated at a pH range of between about 7 and about 10. In various embodiments, other product materials may also be removed by raising the pH or otherwise altering solubility conditions to cause precipitation of the other product material(s). In some embodiments, any number of solvent extraction, settling, filtration, centrifugal separation, or other liquid/liquid or solid/liquid separation techniques, or any combination thereof, may be used in addition to or in combination with the pH-shift precipitation for removal of iron-bearing products and/or other product materials.

After the product/iron removal step, the solution may be directed to a magnesium-removal step at block 1308 in which the solution pH may be further increased to between about 10 and about 12 by controlling a further base addition (and/or controlling other solubility conditions) such that magnesium hydroxide ($Mg(OH)_2$) solid is precipitated. In some embodiments, any number of solvent extraction, settling, filtration, centrifugal separation, or other liquid/liquid or solid/liquid separation techniques, or any combination thereof, may be used in addition to or in combination with the pH-shift precipitation for removal of magnesium hydroxide and/or other product materials.

Figure 14A:
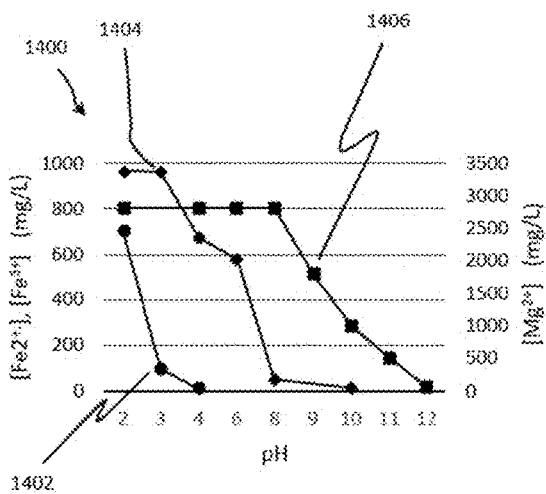
FIG. 14A is a plot showing precipitation of Mg and Fe as a function of pH.

The chart 1400 of FIG. 14A illustrates precipitation of ferric iron ($Fe^{3+}$) as ferric hydroxide $Fe(OH)_3$ 1402, ferrous iron ($Fe^{2+}$) as ferrous hydroxide ($Fe(OH)_2$ 1404, and magnesium ($Mg^{2+}$) as magnesium hydroxide ($Mg(OH)_2$) 1406. As shown in FIG. 14A, quantities of both ferrous hydroxide and magnesium hydroxide may precipitate at a pH of about 8-10 (+/−~0.5 pH). In some embodiments, precipitation of iron and magnesium may be performed in multiple steps. For example, most of the ferrous iron may be precipitated before precipitating any magnesium, but as pH approaches 10, magnesium will begin to precipitate. Therefore, a first iron precipitation may be performed to recover substantially pure ferrous iron hydroxide with substantially no magnesium hydroxide (e.g., with less than 1% magnesium hydroxide by weight), and a subsequent second precipitation may be performed to recover substantially only magnesium hydroxide (e.g., with less than 1% ferrous hydroxide by weight), or a mixture of iron hydroxide and magnesium hydroxide (e.g., anywhere from 1% ferrous hydroxide to 99% ferrous hydroxide by weight mixed with 1% to 99% magnesium hydroxide by weight).

In some embodiments, a subsequent third precipitation may also be performed to recover substantially pure magnesium hydroxide with little or no iron hydroxide (e.g., less than 1% ferrous hydroxide). Alternatively, a first precipitation can be performed to obtain a mixture of precipitated iron hydroxide (ferrous and/or ferric, depending on conditions) and magnesium hydroxide, and a second precipitation can be performed to recover substantially only magnesium hydroxide with substantially no iron hydroxide (e.g., less than 1% iron hydroxide, ferric and ferrous combined). As used herein, the term "substantially no" in reference to the precipitation of a particular compound means that less than 1 wt. % of a particular compound is present in the precipitated material, based on the total amount of all precipitated material in a given precipitation step. Similarly, the term "substantially only" in reference to the precipitation of a particular compound means that at least 99 wt. % of a particular compound is present in the precipitated material, based on the total amount of all precipitated material in a given precipitation step.

A similar phenomenon may occur at lower pH approaching the beginning of ferrous iron hydroxide precipitation around pH 8. Some impurities such as nickel may precipitate at pH ranges slightly overlapping precipitation of ferrous iron hydroxide. If desired, a mixture of ferrous iron hydroxide and hydroxides of nickel, aluminum, chromium, or other metals may be recovered prior to recovering a substantially pure ferrous iron hydroxide precipitate or a mixture of ferrous hydroxide and magnesium hydroxide.

In other embodiments, the $Fe^{2+}$ (ferrous ions) produced by dissolution of olivine ore (or other ores or materials containing ferrous iron) may be oxidized to $Fe^{3+}$ (ferric ions) prior to the "impurity removal" step 1304. As shown in FIG. 14A, ferric hydroxide ($Fe(OH)_3$) precipitates at a lower pH than either ferrous hydroxide or magnesium hydroxide. Nickel, chromium, aluminum, and other metal hydroxides also tend to precipitate at pH ranges higher than ferric hydroxide precipitation. Therefore, if substantially all ferrous ions are converted to ferric ions prior to any precipitation steps, then the Fe separation step 1306 may be performed before the impurity removal step 1304. If only a portion of the ferrous ions are converted to ferric ions prior to any precipitation steps, then two Fe separation steps 1306 may be performed, one before the impurity removal step 1304, and one after. In various embodiments, ferrous ions may be oxidized to ferric ions chemically such as by addition of hydrogen peroxide (11202), or by bubbling gaseous oxygen or ozone through the electrolyte. Any commercially available ozone generator may be used, such as those that form ozone from water either by applying ultraviolet light or by corona discharge. Alternatively, ferrous ions may be oxidized to ferric ions electrochemically.

In some embodiments, the magnesium hydroxide may be used for $CO_2$ sequestration by exposing the $Mg(OH)_2$ to $CO_2$-containing gas such as air or more concentrated streams such as industrial flue gasses. In such embodiments, one mole of magnesium hydroxide may sequester one mole of $CO_2$ as magnesium carbonate according to:

$$Mg(OH)_2 + CO_2 \rightarrow Mg(CO_3) + H_2O$$

In some embodiments, the $Mg(OH)_2$ may be added to seawater, thereby forming bicarbonate (or "hydrogen carbonate," $HCO_3$) and sequestering two moles of $CO_2$ for each mole of magnesium hydroxide according to:

$$Mg(OH)_2 + 2H_2CO_3 \rightarrow Mg(HCO_3)_2 + 2H_2O$$

In some embodiments, iron hydroxide precipitated from the solution may be used in iron or steel production by thermal and/or chemical reduction to metallic iron (e.g., in a blast furnace, basic oxygen furnace, or by direct thermal reduction in a reducing gas such as hydrogen) and optional conversion to steel (e.g., in a blast furnace, basic oxygen furnace, an electric arc furnace, or other system for melting iron and adding elements to make steel). In some embodiments, a mixture of iron hydroxide with magnesium hydroxide and/or other metal hydroxides such as nickel hydroxides, aluminum hydroxides, chromium hydroxides, etc. may be similarly used for iron or steel production. If mixtures of iron hydroxide and other metal hydroxides are collected, then in some cases, separate grades of iron hydroxide may be separated and optionally sold. For example, a substantially pure ferric hydroxide or a substantially pure ferrous hydroxide product may be sold as a high-purity iron product. Iron hydroxide (either ferric or ferrous) mixed with other metals (e.g., Al, Ni, Mg, Cr, etc.) may be sold as separate grades, which may be blended with higher and/or lower grades of iron feedstock in a steelmaking process, for example.

In some embodiments, precipitated iron hydroxide may be electrochemically reduced to metallic iron in an alkaline electrodeposition process. In such systems, an alkaline iron hydroxide slurry may be brought into contact with a conductive electrode, and an applied electrical current may be used to cathodically reduce the iron hydroxide to metallic iron while anodically evolving oxygen gas.

Once the desired products have been removed from the solution, the remaining salt solution may be recovered and returned to a salt storage tank 1312 or directly to the ABG 1310 for a subsequent dissolution and product removal cycle.

In some embodiments, as described elsewhere herein (e.g., with reference to FIG. 11 and FIG. 12), the acid tank 1320 may utilize an ion exchange resin in an acidifying solution-recirculating loop between the ABG 1310 and the acid storage tank 1320 so as to increase efficiency of the ABG. Therefore, additional features such as a circulation loop for restoring the ion exchange resin and other features as described herein may be included.

In some embodiments, as described herein, the ABG may be configured to produce a weak acid such as carbonic acid, acetic acid, citric acid, malic acid, oxalic acid, boric acid, and/or others. Mafic minerals including olivine may be adequately soluble in such weak acids, which may tend to allow for more efficient operation of the ABG.

If a mineral does not contain iron, the steps at bloc 1306 may be omitted. For instance, if the mineral is limestone or wollastonite, iron may not be present and calcium hydroxide would be the product of interest ($CO_2$ capture material) instead of magnesium hydroxide. In this case, calcium hydroxide may be precipitated the same way as described above with reference to magnesium hydroxide in bloc 1308 through progressive addition of a base from base storage tank 1322. The precipitation pH for calcium hydroxide may be around 11 to 13, slightly higher than for magnesium hydroxide.

Figure 14B:
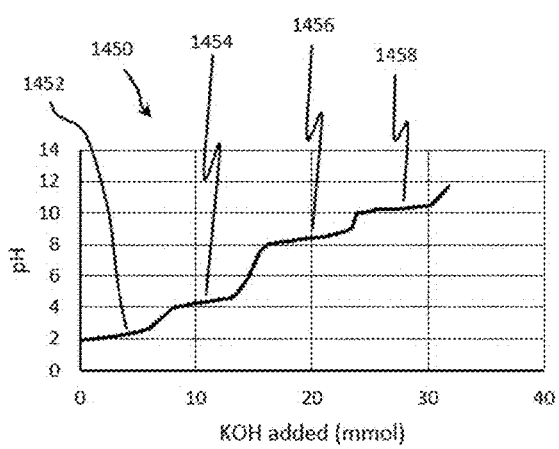
FIG. 14B is a plot showing pH of a solution initially containing $Fe^{2+}$, $Mg^{2+}$, and $Al^{3+}$ as a function of base added to the solution, showing precipitation plateaus.

Control of the above process may be understood with reference to FIG. 14B, which shows pH of a solution as a function of base (KOH) added to the solution. The solution illustrated in FIG. 14B was initially prepared by dissolving ferrous iron sulfate ($FeSO_4$), magnesium sulfate ($MgSO_4$), and aluminum sulfate ($Al_2(SO_4)_3$). The curve in FIG. 14B shows a series of plateaus (1452, 1454, 1456, 1458) during which dissolved species precipitate out of solution as they consume the added base until that species is depleted. Once a species is depleted, additional added base raises the pH at a faster rate until another species begins to precipitate. The first section 1452 indicates acid-base titration in a pH range of about 2 to 4. The second plateau 1454 at a pH of about 4 to about 5 indicates precipitation of aluminum hydroxide ($Al(OH)_3$). The third plateau 1456 at a pH of about 8 to 9 indicates precipitation of ferrous iron hydroxide ($Fe(OH)_2$). The fourth plateau 1458 at a pH of about 10 to 11 indicates precipitation of magnesium hydroxide ($Mg(OH)_2$). If calcium ions were present in this solution, it is believed a fifth plateau would be present at a pH of about 12 indicating precipitation of calcium hydroxide ($Ca(OH)_2$).

Using an empirically derived chart such as that shown in FIG. 14B based on a solution produced by dissolving a particular mineral (or non-mineral) feedstock, a mineral-specific process for selectively precipitating hydroxides of dissolved species may be developed. During each plateau, pH rises relatively slowly. When each plateau ends, the slope of the pH rise increases, indicating depletion of dissolved material at that plateau. Therefore, at each increasing slope point, base addition may be paused and precipitated materials may be separated from the solution using any suitable solid-liquid separation technique. Once the precipitated material has been removed, pH additions may resume until the end of the next plateau is detected by an increased slope of pH rise, at which point the base addition may again be paused while the new precipitated material is separated from the solution.

Electrodialytic Acid and Base Production

Figure 15:
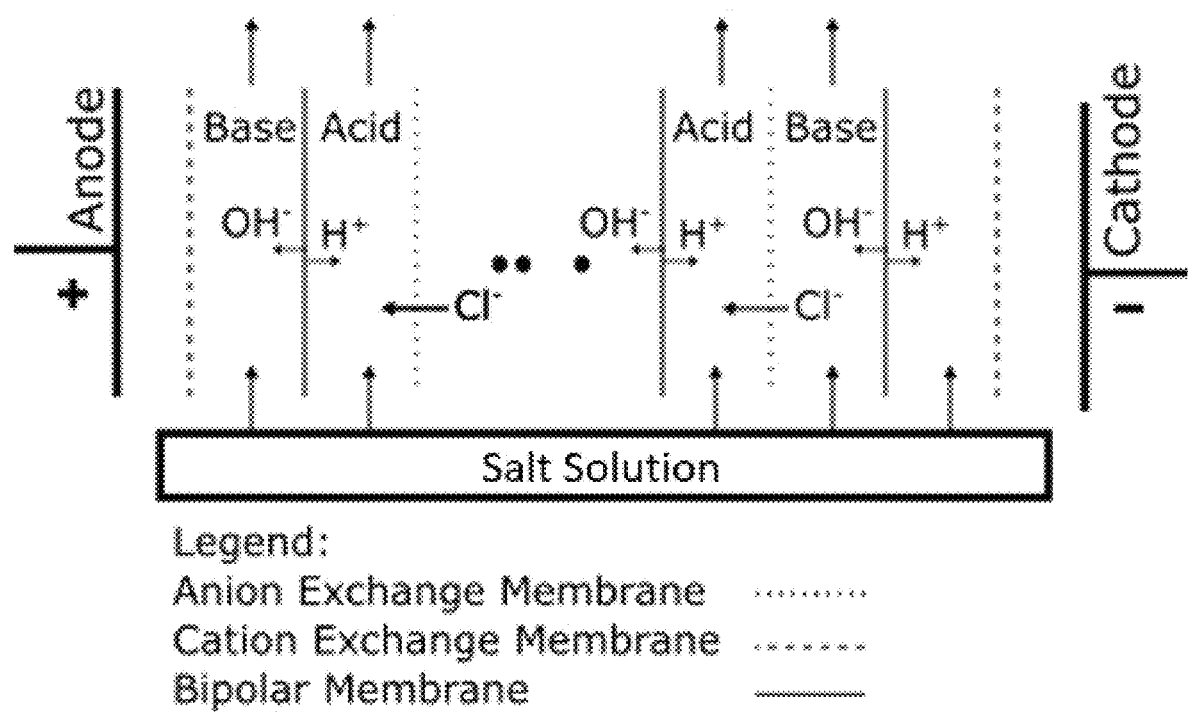
FIG. 15 is a schematic diagram illustrating an electrodialytic acid-base generation cell utilizing a bipolar membrane to split water and concentrate separate acid and base streams.

Traditional electrodialytic bipolar membrane based systems for acid-base generation (i.e., electrodialytic acid base generators) typically comprise CEM (or PEM), AEM and bipolar membrane as depicted in FIG. 15. The acid and base are generated in the chambers adjacent to the bipolar membrane. Typically, the negative electrode generates hydrogen and hydroxyl ion through water reduction, and the positive electrode generates oxygen and proton through water oxidation or chlorine from chloride oxidation which is undesirable. In one embodiment, the hydrogen from the negative electrode may be collected and directed back to the positive anode electrode in any of the configurations described herein with reference to electrolytic acid base generators to depolarized the anode electrode, thereby eliminating water or chlorine oxidation reactions.

Any electrodialytic acid base generator may also be used in a recirculating configuration with acid and base storage tanks to concentrate the acid and base products in the tanks until desired concentrations are reached as described herein with reference to electrolytic acid base generators. This further allows for decoupling of production and use of acid and base solutions.

Other electrodialytic acid base generation systems are shown and described in U.S. Pat. Nos. 8,778,156, 9,586,181, 9,862,643, and 9,873,650, which are incorporated herein by reference for all purposes.

Aspects of the Invention

Various aspects are contemplated herein, several of which are set forth in the paragraphs below. It is explicitly contemplated that any aspect or portion thereof can be combined to form an aspect.

Aspect 1: A method of making a material for capturing carbon dioxide from the earth's atmosphere, comprising: producing an acid and a base with an electrochemical acid-base generator; dissolving a mineral in the acid to produce a mineral rich solution, wherein the mineral contains iron, silica, and at least one of magnesium and calcium; separating silica from the mineral rich solution to form a silica depleted solution; adding, in a first precipitation step, a first portion of the base to the silica depleted solution to remove impurities by precipitation, thereby forming an impurity-depleted solution; adding, in a second precipitation step, a second portion of the base to the impurity-depleted solution until solution pH reaches a range of 7 to 10 to precipitate ferrous hydroxide ($Fe(OH)_2$) to form an iron-depleted solution, then pausing base addition and removing the ferrous hydroxide precipitate from the solution; adding, in a third precipitation step, adding a third portion of the base to the iron-depleted solution to raise the pH to a range of 10 to 13 to precipitate magnesium hydroxide ($Mg(OH)_2$) and/or calcium hydroxide ($Ca(OH)_2$) to a form a recovered salt solution, then separating the magnesium hydroxide and/or calcium hydroxide from the solution; and directing the recovered salt solution to the electrochemical acid-base generator to produce a new acid and a new base.

Aspect 2: The method of aspect 1, further comprising storing the acid in an acid storage tank prior to dissolving the mineral, and storing the base in a base storage tank prior to adding a first portion of the base to the silica depleted solution.

Aspect 3: The method of aspect 1 or 2, further comprising directing the recovered salt solution to a salt storage tank and then directing the recovered salt solution to the electrochemical acid-base generator to produce a new acid and a new base.

Aspect 4: The method of any of aspects 1-3, wherein the acid is or comprises at least one member of the group consisting of hydrochloric acid, sulfuric acid, carbonic acid, carboxylic acid, citric acid, maleic acid, boric acid, and an organic acid.

Aspect 5: The method of any of aspects 1-4, wherein: the second precipitation step comprises adding base until solution pH reaches a first pH range at which a second precipitate product comprising a first quantity of ferrous hydroxide and less than 1% by weight magnesium hydroxide is precipitated, and wherein base additions are paused when solution pH reaches a second pH threshold indicating completion of the second precipitation; the third precipitation step comprises adding base until solution pH reaches a second pH range higher than the first pH range, and wherein a mixture of ferrous hydroxide and magnesium hydroxide precipitates in the second pH range; and the fourth precipitation step comprises adding base until solution pH reaches a third pH range higher than the second pH range to precipitate a fourth precipitation product comprising magnesium hydroxide and less than 1% by weight ferrous hydroxide.

Aspect 6: The method of any of aspects 1-5, further comprising, after producing the acid and prior to the dissolving step, capturing the acid in an acid-capturing ion exchange resin to form a captured acid, and subsequently releasing the captured acid by regenerating the ion exchange resin with a regeneration solution.

Aspect 7: The method of any of aspects 1-6, wherein the second precipitation step further comprises adding metallic iron to the impurity-depleted solution.

Aspect 8: The method of any of aspects 1-7, wherein the base produced in the electrochemical acid-base generator contains a ratio of dissolved salt anions to produced hydroxyl anions equal to, or within 10% of, a ratio of their respective ionic mobilities.

Aspect 9: The method of any of aspects 1-8, wherein during operation, the acid produced by the electrochemical acid-base generator contains a ratio of dissolved salt cations to produced protons equal to, or within 10% of, a ratio of their respective ionic mobilities.

Aspect 10: A method of capturing and sequestering carbon dioxide from a gas mixture containing carbon dioxide, the method comprising producing magnesium hydroxide and/or calcium hydroxide according to any of the methods of aspects 1-9, and exposing the magnesium hydroxide or calcium hydroxide to the gas mixture to form magnesium carbonate or calcium carbonate.

Aspect 11: A method of capturing and sequestering carbon dioxide from seawater, the method comprising producing magnesium hydroxide and/or calcium hydroxide according to any of the methods of aspects 1-9, and depositing the magnesium hydroxide and/or calcium hydroxide in seawater to form bicarbonate.

Aspect 12: A method of making a material for capturing carbon dioxide from the earth's atmosphere, comprising: producing an acid and a base with an electrochemical acid-base generator; dissolving a mineral in the acid to produce a mineral rich solution, wherein the mineral contains at least one of magnesium and calcium; separating silica from the mineral rich solution to form a silica depleted solution; adding, in a first precipitation step, a first portion of the base to the silica depleted solution until a first increase in a slope of pH to base addition, then pausing base addition and removing impurities by precipitation, thereby forming an impurity-depleted solution; adding, in a second precipitation step, a second portion of the base to the impurity-depleted solution until a second increase in the slope of pH to base addition while precipitating ferrous hydroxide ($Fe(OH)_2$) to form an iron-depleted solution, then pausing base addition and removing the ferrous hydroxide precipitate from the solution; adding, in a third precipitation step, adding a third portion of the base to the iron-depleted solution until a third increase in a slope of pH to base addition while precipitating magnesium hydroxide ($Mg(OH)_2$) and/or calcium hydroxide ($Ca(OH)_2$) to a form a recovered salt solution, then separating the magnesium hydroxide and/or calcium hydroxide from the solution; and directing the recovered salt solution to the electrochemical acid-base generator to produce a new acid and a new base.

Aspect 13: A method of removing carbon dioxide from seawater, comprising: making an aqueous salt solution by dissolving a salt in fresh water; dividing the aqueous salt solution into an acidifying solution volume and a basifying solution volume; driving the acidifying solution volume and the basifying solution volume through an electrochemical acid-base generator to acidify the acidifying solution volume to produce an acid solution and to basify the basifying solution volume to form a base solution; mixing a volume of seawater with a volume of the acid solution sufficient to produce an acidified seawater solution with a pH of between 3 and 5; removing $CO_2$ gas from the acidified seawater solution to produce a decarbonized acidified seawater solution; mixing a volume of the decarbonized acidified seawater solution with a volume of the base solution sufficient to produce a decarbonized seawater solution with a pH of about 8.0; and returning a volume of the decarbonized seawater solution to a body of water.

Aspect 14: The method of aspect 13, wherein the fresh water is de-ionized water, micro-filtered water, filtered water, or any combination thereof.

Aspect 15: A method of removing carbon dioxide from seawater, comprising: driving a first volume of seawater as acidifying solution through an acid-concentrating chamber of an electrochemical acid-base generator; driving a second volume of seawater as basifying solution through a base-concentrating chamber of the electrochemical acid-base generator; applying electrical power to the electrochemical acid-base generator to acidify a volume of the acidifying solution to produce an acid solution and to basify a volume of the basifying solution to produce a base solution; mixing a third volume of seawater with a volume of the acid solution sufficient to produce an acidified seawater solution with a pH of between 3 and 5; removing $CO_2$ gas from the acidified seawater solution to produce a decarbonized acidified seawater solution; mixing a volume of the decarbonized acidified seawater solution with a volume of the base solution sufficient to produce a decarbonized seawater solution with a pH of about 8.0; and returning a volume of the decarbonized seawater solution to a body of water.

Aspect 16: The method of any of aspects 13-15, wherein the electrochemical acid-base generator comprises an anion exchange membrane.

Aspect 17: The method of any of aspects 13-16, wherein during operation, the basifying solution in the electrochemical acid-base generator contains an instantaneous ratio of dissolved salt anions to produced hydroxyl anions equal to, or within 10% of, a ratio of their respective ionic mobilities.

Aspect 18: The method of any of aspects 13-17, wherein the electrochemical acid-base generator comprises a cation exchange membrane (PEM).

Aspect 19: The method of any of aspects 13-18, wherein during operation, the acidifying solution in the electrochemical acid-base generator contains an instantaneous ratio of dissolved salt cations to produced protons equal to, or within 10% of, a ratio of their respective ionic mobilities.

Aspect 20: The method of any of aspects 13-19, wherein hydrogen gas is mixed with the acidifying solution prior to introducing the acidifying solution into the anode chamber of the electrochemical acid-base generator.

Aspect 21: The method of any of aspects 13-20, wherein hydrogen gas is introduced into the anode chamber independently of the acidifying solution.

Aspect 22: A method of extracting calcium and carbon dioxide from seawater, the method comprising: driving a first volume of aqueous salt solution as acidifying solution through an anode chamber of an electrochemical acid-base generator; driving a second volume of aqueous salt solution as basifying solution through a cathode chamber of the electrochemical acid-base generator; applying electrical power to the electrochemical acid-base generator to acidify a volume of the acidifying solution to produce an acid solution and to basify a volume of the basifying solution to produce a base solution; mixing a third volume of seawater containing dissolved inorganic carbon species with a volume of the base solution sufficient to produce a mixture with a pH of about 12, or between about 10 and about 13, to thereby convert bicarbonate ($HCO_3^-$) in the third volume of seawater to solid calcium carbonate precipitate ($CaCO_3$); separating the solid calcium carbonate precipitate from the mixture to produce a separated liquid mixture and retaining the solid calcium carbonate precipitate; adding a volume of the acid solution to a volume of the separated liquid mixture sufficient to produce a second mixture with a pH of about 8.0; and returning the second mixture to a seawater body.

Aspect 23: A method of making cement, comprising: driving a first volume of aqueous salt solution as acidifying solution through an acid-concentrating chamber of an electrochemical acid-base generator; driving a second volume of aqueous salt solution as basifying solution through a base-concentrating chamber of the electrochemical acid-base generator; applying electrical power to the electrochemical acid-base generator to acidify a volume of the acidifying solution to produce an acid solution and to basify a volume of the basifying solution to produce a base solution; dissolving a calcium-containing solid material in the acid solution to produce a calcium-rich acidic solution; mixing the calcium-rich acidic solution with a volume of the base solution to produce a mixture, the volume of the base solution sufficient to cause calcium hydroxide ($Ca(OH)_2$) to precipitate from the mixture; capturing carbon dioxide gas released during precipitation of the calcium hydroxide; removing the precipitated calcium hydroxide from the mixture to produce a second mixture; heating the precipitated calcium hydroxide with silicate and/or clay at a temperature of between about 1,000 and 2,000° C. to form tricalcium silicate; and after removing the precipitated calcium hydroxide, returning the second mixture to the electrochemical acid-base generator as acidifying solution and/or basifying solution.

Aspect 24: The method of aspect 23, wherein the calcium-containing solid material is calcium carbonate extracted from seawater by the process of aspect 10.

Aspect 25: The method of aspect 23 or 24, wherein the calcium-containing solid material is a material selected from the group consisting of calcite, aragonite, vaterite, limestone, chalk, marble, travertine, eggshells, oyster shells, limescale, agricultural lime, and any combination thereof.

Aspect 26: An electrochemical acid-base generator, comprising: a stack of electrochemical cells, wherein each of the cells comprises: an acid-concentrating chamber containing a non-vertically oriented planar anode electrode, an acidifying solution inlet and an acidifying solution outlet; a base-concentrating chamber containing a non-vertically oriented planar cathode electrode, a basifying solution inlet and a basifying solution outlet; a separator membrane separating the anode chamber from the cathode chamber; and a flow-field layer between the anode electrode and the separator membrane, wherein the anode has a hydrophobicity gradient with a hydrophilic face adjacent to the flow field layer and a hydrophobic face opposite the hydrophilic face.

Aspect 27: The electrochemical acid-base generator of aspect 26, wherein the separator membrane is or comprises a cation exchange membrane.

Aspect 28: The electrochemical acid-base generator of aspect 26, wherein the separator membrane is or comprises a ceramic NASICON membrane.

Aspect 29: The electrochemical acid-base generator of any of aspects 26-28, wherein an acidifying solution flowable through the anode chamber and a basifying solution flowable through the cathode chamber both are, or comprise, seawater.

Aspect 30: The electrochemical acid-base generator of any of aspects 26-28, wherein an acidifying solution flowable through the anode chamber and a basifying solution flowable through the cathode chamber are both clean salt solutions made from dissolving salt in de-ionized water.

Aspect 31: The electrochemical acid-base generator of any of aspects 26 and 29-30, wherein the separator membrane is or comprises an anion exchange membrane.

Aspect 32: The electrochemical acid-base generator of aspect 31, wherein an acidifying solution flowable through the anode chamber and a basifying solution flowable through the cathode chamber both are, or comprise, seawater.

Aspect 33: The electrochemical acid-base generator of aspect 31, wherein an acidifying solution flowable through the anode chamber and a basifying solution flowable through the cathode chamber are both clean salt solutions made from dissolving salt in de-ionized water.

Aspect 34: The electrochemical acid-base generator of any of aspects 26-33, wherein each of the cells comprises a third chamber positioned between the anode chamber and the cathode chamber.

Aspect 35: The method of any of aspects 1-12, wherein the electrochemical acid-base generator is the acid-base generator of any of aspects 26-34.

Aspect 36: A method of removing carbon dioxide from a gas mixture, comprising: in an electrolytic reactor comprising an anode chamber separated from a cathode chamber by an ion-selective separator membrane, reacting an aqueous salt solution to produce an acid in the anode chamber while producing a base in the cathode chamber; contacting a carbon-dioxide-containing gas with the base to form a metal carbonate solution; introducing the metal carbonate solution into the anode chamber, wherein the metal carbonate solution is converted into a weak acid solution; withdrawing the weak acid solution from the anode chamber; subjecting the weak acid solution to a negative pressure sufficient to separate carbon dioxide from the weak acid solution, thereby leaving recovered water; and directing the recovered water into the cathode chamber.

Aspect 37: An electrochemical carbon capture system, comprising: a stack of electrochemical cells, wherein each of the cells comprises: an anode chamber containing a non-vertically oriented planar anode electrode, an acidifying solution inlet and an acidifying solution outlet; a cathode chamber containing a non-vertically oriented planar cathode electrode, a basifying solution inlet and a basifying solution outlet; a separator membrane separating the anode chamber from the cathode chamber; and a flow-field layer between the anode electrode and the separator membrane, wherein the anode has a hydrophobicity gradient with a hydrophilic face adjacent to the flow field layer and a hydrophobic face opposite the hydrophilic face.

Aspect 38: A method of making acid and base from a salt, the method comprising: electrochemically converting an initial salt solution into an acidified salt solution and a basified solution using an electrochemical acid-base generator, the electrochemical acid-base generator comprising a hydrogen-evolving cathode and a hydrogen-oxidizing anode; the electrochemical acid-base generator comprising an acid production chamber in which the acidified salt solution is produced and a base production chamber in which the basified solution is produced; the electrochemical acid-base generator being configured to direct hydrogen from the cathode to the anode during operation; circulating the basified solution between the base production chamber and a base storage tank; directing the acidified salt solution into an ion exchange tank containing a cation exchange resin charged with first metal cations corresponding to cations in the initial salt solution, wherein the cation exchange resin captures acid from the acidified salt solution by exchanging protons from the acidified salt solution with the first metal cations from the cation exchange resin, thereby forming a de-acidified salt solution; and returning the de-acidified salt solution from the ion exchange tank to the acid production chamber, the de-acidified salt solution exiting the ion exchange tank having a greater concentration of salt than the acidified salt solution exiting the acid production chamber.

Aspect 39: The method of aspect 38, further comprising draining at least a portion of liquid from the ion exchange tank and passing a regeneration solution comprising second metal cations through the cation exchange resin, wherein the regeneration solution replaces protons in the cation exchange resin with the second metal cations such that the regeneration solution exiting the exchange tank is acidified, wherein the first metal cations and the second metal cations can be the same or different.

Aspect 40: The method of aspect 38 or 39, wherein the regeneration solution is or comprises seawater, and the method further comprises removing acidified seawater, then extracting $CO_2$ from the acidified seawater.

Aspect 41: The method of aspect 40, further comprising mixing the basified solution with the acidified seawater.

Aspect 42: The method of any of aspects 38-41, wherein the regeneration solution is or comprises concentrated brine from a desalination process, and the method further comprises removing acidified brine, then extracting $CO_2$ from the acidified brine.

Aspect 43: The method of aspect 42, further comprising mixing the basified solution with the acidified brine.

Aspect 44: The method of any of aspects 38-43, wherein the regeneration solution is or comprises a purified salt solution made by dissolving purified salt in deionized water.

Aspect 45: The method of any of aspects 38-44, wherein the regeneration solution is treated to remove divalent cations prior to passing the regeneration solution through the cation exchange resin.

Aspect 46: A method of making acid and base from a salt, the method comprising: electrochemically converting an initial salt solution into an acidified salt solution and a basified solution using an electrochemical acid-base generator, the electrochemical acid-base generator comprising a hydrogen-evolving cathode and a hydrogen-oxidizing anode; the electrochemical acid-base generator comprising an acid production chamber in which the acidified salt solution is produced and a base production chamber in which the basified solution is produced; the electrochemical acid-base generator being configured to direct hydrogen from the cathode to the anode during operation; circulating the basified solution between the base production chamber and a base storage tank; directing the acidified salt solution into an ion exchange tank containing a cation exchange resin charged with first metal cations corresponding to cations in the initial salt solution, wherein the cation exchange resin captures acid from the acidified salt solution by exchanging protons from the acidified salt solution with the metal cations from the cation exchange resin, thereby forming a de-acidified salt solution; and returning the de-acidified salt solution from the ion exchange tank to the acid-production chamber, the de-acidified salt solution exiting the ion exchange tank having a greater concentration of salt than the acidified salt solution exiting the acid production chamber.

Aspect 47: The method of aspect 46, further comprising draining at least a portion of the de-acidified salt solution from the ion exchange tank into a temporary storage tank and then passing a regeneration solution through the ion exchange tank, wherein the regeneration solution contains a salt configured to react with the cation exchange resin to replace protons in the cation exchange resin with a metal cation from the salt such that the regeneration solution exiting the ion exchange tank is an acidified product solution.

Aspect 48: The method of aspect 47, wherein the regeneration solution is or comprises seawater and wherein the acidified product solution is or comprises acidified seawater, and the method further comprises extracting $CO_2$ from the acidified seawater.

Aspect 49: The method of aspect 48, further comprising mixing the basified solution with the acidified seawater to form a neutralized seawater solution and delivering the neutralized seawater solution to a body of water.

Aspect 50: The method of any of aspects 46-49, wherein the regeneration solution is or comprises concentrated brine from a desalination process and wherein the acidified product solution is or comprises acidified brine, and the method further comprises extracting $CO_2$ from the acidified seawater.

Aspect 51: The method of aspect 46, further comprising mixing the basified solution with the acidified brine to form a neutralized brine and delivering the neutralized brine to a body of water.

Aspect 52: The method of any of aspects 46-51, wherein the regeneration solution is or comprises a purified salt solution made by dissolving purified salt in deionized water, and wherein the acidified product solution is or comprises a pure acid solution.

Aspect 53: The method of aspect 52, further comprising dissolving a mineral in the pure acid solution to form a mineral-rich solution.

Aspect 54: The method of aspect 53, wherein dissolving the mineral releases carbon dioxide gas, and the method further comprises capturing the carbon dioxide as a pure gas stream.

Aspect 55: The method of aspect 53 or 54, further comprising combining the basified solution with the mineral-rich solution to form a precipitated product which is a hydroxide or oxide comprising one or more elements of the dissolved mineral, and collecting the precipitated product.

STATEMENTS REGARDING INCORPORATION BY REFERENCE AND VARIATIONS

Although the invention has been disclosed in the context of certain embodiments and examples, only the claims define the invention which may include embodiments or examples beyond the specifically disclosed embodiments to other alternative embodiments and/or uses of the invention and obvious modifications and equivalents thereof.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

When a group of substituents is disclosed herein, it is understood that all individual members of that group and all subgroups, are disclosed separately. When a Markush group or other grouping is used herein, all individual members of the group and all combinations and sub-combinations possible of the group are intended to be individually included in the disclosure. For example, when a device is set forth disclosing a range of materials, device components, and/or device configurations, the description is intended to include specific reference of each combination and/or variation corresponding to the disclosed range.

Every combination of components described or exemplified herein can be used to practice the invention, unless otherwise stated.

Whenever a range is given in the specification, for example, a temperature range, a composition, concentration range, or any range of electrochemical or electrolytic performance parameters (e.g., capacity, specific activity, discharge rate, cycling, etc.) all intermediate ranges and subranges, as well as all individual values included in the ranges given are intended to be included in the disclosure. It will be understood that any subranges or individual values in a range or subrange that are included in the description herein can be excluded from the claims herein.

Various embodiments and examples list materials and compounds including various "oxide" and "hydroxide" compounds. Such recitations are intended to include all variants of such materials, including oxyhydroxides, suboxides, solid-solutions, and various polymorphs (different crystal-structure forms) of the same or similar chemical compounds.

All patents and publications mentioned in the specification are indicative of the levels of skill of those skilled in the art to which the invention pertains. References cited herein or included as an appendix indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that electronic materials, fabrication processes, device components and device configurations other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

The invention claimed is:

1. A method comprising:
    producing an acid and a base with an electrochemical acid-base generator;
    dissolving a mineral in the acid to produce a mineral rich solution, wherein the mineral comprises iron, silica, of magnesium, aluminum, and calcium;
    separating insoluble solids from the mineral rich solution to form a solids-depleted solution;
    adding, in a first precipitation step, a first portion of the produced base to the solids-depleted solution to remove first impurities by precipitation, thereby forming a first impurity-depleted solution, wherein the first precipitation step comprises increasing the pH of the solids-depleted solution to a pH selected from the range of 3 to 5 thereby precipitating aluminum hydroxide;
    adding, in a second precipitation step, a second portion of the base to the impurity-depleted solution until the pH of the impurity-depleted solution reaches a pH range at which a second precipitate product comprising ferrous hydroxide is precipitated, thereby forming an iron-depleted solution, and removing the ferrous hydroxide precipitate product from the iron-depleted solution;
    adding, in a third precipitation step, a third portion of the base to the iron-depleted solution to raise the pH of the iron-depleted solution to precipitate magnesium hydroxide and/or calcium hydroxide to form a recovered salt solution, then separating the magnesium hydroxide and/or calcium hydroxide from the recovered salt solution; and
    directing the recovered salt solution to the electrochemical acid-base generator to produce a new acid and a new base.

2. The method of claim 1, wherein the precipitated ferrous hydroxide is extracted and subsequently converted into iron or steel by one or more methods including thermal reduction, chemical reduction, and electrochemical reduction.

3. The method of claim 1, wherein the precipitated ferrous hydroxide is extracted and subsequently reduced to metallic iron.

4. The method of claim 1, wherein the mineral being dissolved comprises a slag.

5. The method of claim 4, wherein the slag is a metal silicate slag from a metallurgical process.

6. The method of claim 5, wherein the slag comprises magnesium, aluminum, and calcium.

7. The method of claim 4, wherein:
    the slag comprises aluminum and the removed first impurities comprise an aluminum compound; and
    the slag comprises chromium and the removed first impurities comprise a chromium compound.

8. The method of claim 1, wherein the separated insoluble solids comprise silica.

9. The method of claim 1 further comprising removing colloidal silica from the mineral rich solution.

10. The method of claim 1, wherein the removed first impurities comprise ferric hydroxide.

11. The method of claim 1, wherein the second precipitate product comprises at least 99 wt. % ferrous hydroxide.

12. The method of claim 1, wherein the second precipitation step comprises adding the second portion of the base to the impurity-depleted solution until the pH of the impurity-depleted solution reaches a range of 7 to 10 to precipitate the ferrous hydroxide.

13. The method of claim 1, wherein the second precipitation step further comprises adding metallic iron to the impurity-depleted solution.

14. The method of claim 1, wherein the second precipitate product contains less than 1% by weight magnesium hydroxide.

15. The method of claim 1, wherein the third precipitation step comprises adding the third portion of the base to the iron-depleted solution to raise the pH of the iron-depleted solution to a range of 10 to 13 to precipitate magnesium hydroxide and/or calcium hydroxide.

16. The method of claim 1, wherein the third precipitation step comprises precipitating magnesium hydroxide and less than 1% by weight iron hydroxide.

17. The method of claim 1, wherein:
    the second precipitation step comprises adding base until the pH of the impurity-depleted solution reaches a first pH range at which a second precipitate product comprising a first quantity of ferrous hydroxide and less than 1% by weight magnesium hydroxide is precipitated, and wherein base additions are paused when the pH of the impurity-depleted solution reaches a second pH threshold indicating completion of the second precipitation;
    the third precipitation step comprises adding base until the pH of the iron-depleted solution reaches a second pH range higher than the first pH range, and wherein a mixture comprising ferrous hydroxide and magnesium hydroxide precipitates in the second pH range; and
    the method comprises a fourth precipitation step comprising adding base until the pH of the recovered salt solution reaches a third pH range higher than the second pH range to precipitate a fourth precipitation product comprising magnesium hydroxide and less than 1% by weight ferrous hydroxide.

18. The method of claim 1, wherein the base produced in the electrochemical acid-base generator contains a ratio of dissolved salt anions to produced hydroxide anions equal to, or within 10% of, a ratio of their respective ionic mobilities.

19. The method of claim 1, wherein during operation, the acid produced by the electrochemical acid-base generator contains a ratio of dissolved salt cations to produced protons equal to, or within 10% of, a ratio of their respective ionic mobilities.

20. The method of claim 1, wherein the electrochemical acid-base generator comprises an anion exchange membrane (AEM).

21. The method of claim 1, wherein the electrochemical acid-base generator comprises a cation exchange membrane (PEM).

22. The method of claim 1, wherein the acid-base generator is an electrolytic acid-base generator.

23. The method of claim 1, comprising providing intermittent power to the acid-base generator and comprising turning down or shutting down the acid-base generator to operate at lower current densities during periods of low power.

24. The method of claim 1, further comprising storing the acid in an acid storage tank prior to dissolving the mineral, and storing the base in a base storage tank prior to adding the first portion of the base to the solids-depleted solution.

25. The method of claim 1, further comprising directing the recovered salt solution to a salt storage tank and then directing the recovered salt solution to the electrochemical acid-base generator to produce the new acid and the new base.

26. The method of claim 1, wherein the acid is or comprises at least one member of the group consisting of hydrochloric acid, sulfuric acid, carbonic acid, carboxylic acid, citric acid, maleic acid, boric acid, and an organic acid.

27. The method of claim 1, wherein the acid is or comprises sulfuric acid.

28. The method of claim 1, wherein the first precipitation step comprises increasing the pH of the solids-depleted solution to a pH selected from a first pH range of 3 to 5; and wherein the second precipitation step comprises adding the second portion of the base until the pH of the impurity-depleted solution reaches a second pH range higher than the first pH range.

29. The method of claim 1, wherein the third precipitation step comprises adding the third portion of the base to raise the pH of the iron-depleted solution to a third pH range higher than the second pH range.

* * * * *